United States Patent
Asada et al.

(10) Patent No.: US 9,895,800 B2
(45) Date of Patent: *Feb. 20, 2018

(54) ROBOT, ROBOT CONTROL DEVICE, AND ROBOT SYSTEM

(71) Applicant: Seiko Epson Corporation, Tokyo (JP)

(72) Inventors: Atsushi Asada, Matsumoto (JP); Akio Niu, Matsumoto (JP); Hiroaki Hosomi, Minowa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,274

(22) Filed: Feb. 3, 2016

(65) Prior Publication Data

US 2016/0151914 A1 Jun. 2, 2016

Related U.S. Application Data

(63) Continuation of application No. 14/197,692, filed on Mar. 5, 2014, now Pat. No. 9,327,409.

(30) Foreign Application Priority Data

Jun. 5, 2013 (JP) .................. 2013-118670

(51) Int. Cl.
*G06F 19/00* (2011.01)
*B25J 9/16* (2006.01)
(Continued)

(52) U.S. Cl.
CPC .............. *B25J 9/1628* (2013.01); *B25J 9/04* (2013.01); *B25J 9/1694* (2013.01); *B25J 13/088* (2013.01); *Y10S 901/09* (2013.01)

(58) Field of Classification Search
CPC . B25J 9/1628; B25J 9/04; B25J 9/1694; B25J 13/088; Y10S 901/09
(Continued)

(56) References Cited

U.S. PATENT DOCUMENTS

| 4,882,527 A | 11/1989 | Yakuyama et al. |
| 4,937,759 A | 6/1990 | Vold |

(Continued)

FOREIGN PATENT DOCUMENTS

| CN | 102192731 A | 9/2011 |
| CN | 102501242 A | 6/2012 |

(Continued)

OTHER PUBLICATIONS

A3G4250D MEMS motion sensor:3-axis digital output gyroscope Feb. 2012, ST Microelectronics, Doc 022768 Rev3, pp. 1-45.

(Continued)

*Primary Examiner* — Ronnie Mancho
(74) *Attorney, Agent, or Firm* — Harness, Dickey & Pierce, P.L.C.

(57) ABSTRACT

A robot includes a base, a first arm which is rotatable around a first rotating axis with respect to the base, a second arm which is rotatable around a second rotating axis orthogonal to the first rotating axis, a third arm which is rotatable around a third rotating axis parallel to the second rotating axis, a first angular velocity sensor provided in the first arm, and a second angular velocity sensor provided in the third arm. The angle between a detection axis of the first angular velocity sensor and the first rotating axis is a predetermined first angle. The angle between a detection axis of the second angular velocity sensor and the second rotating axis is a predetermined second angle.

20 Claims, 21 Drawing Sheets

(51) Int. Cl.
*B25J 13/08* (2006.01)
*B25J 9/04* (2006.01)

(58) Field of Classification Search
USPC .... 700/254, 258, 263, 245, 262; 901/27, 30; 318/568.11
See application file for complete search history.

(56) References Cited

U.S. PATENT DOCUMENTS

| | | | |
|---|---|---|---|
| 5,550,953 A | 8/1996 | Seraji | |
| 5,581,166 A | 12/1996 | Eismann et al. | |
| 5,710,870 A | 1/1998 | Ohm et al. | |
| 5,781,705 A | 7/1998 | Endo | |
| 5,944,476 A | 8/1999 | Bacchi et al. | |
| 6,216,056 B1 | 4/2001 | Ito et al. | |
| 6,296,093 B1* | 10/2001 | Norris | B23Q 11/0032 188/378 |
| 6,343,242 B1 | 1/2002 | Nomura et al. | |
| 6,505,085 B1* | 1/2003 | Tuttle | B25J 9/1605 700/28 |
| 6,922,034 B2 | 7/2005 | Hirose | |
| 7,202,442 B2 | 4/2007 | Nakagiri et al. | |
| 7,233,872 B2 | 6/2007 | Shibasaki et al. | |
| 7,756,606 B2 | 7/2010 | Nakajima et al. | |
| 7,765,023 B2 | 7/2010 | Oaki et al. | |
| 8,195,368 B1* | 6/2012 | Leban | B66C 13/063 212/277 |
| 8,631,720 B2 | 1/2014 | Nakagiri et al. | |
| 2003/0020461 A1 | 1/2003 | Nomura et al. | |
| 2003/0178964 A1 | 9/2003 | Challoner | |
| 2005/0113973 A1 | 5/2005 | Endo et al. | |
| 2005/0151497 A1 | 7/2005 | Nagasaka | |
| 2005/0166413 A1 | 8/2005 | Crampton | |
| 2005/0177279 A1* | 8/2005 | Osten | B25J 9/1623 700/258 |
| 2005/0191050 A1 | 9/2005 | Chapman | |
| 2005/0240307 A1 | 10/2005 | Kuroki et al. | |
| 2005/0246061 A1 | 11/2005 | Oaki et al. | |
| 2007/0152619 A1* | 7/2007 | Sugiyama | B25J 9/1612 318/568.12 |
| 2007/0288124 A1* | 12/2007 | Nagata | B25J 9/1694 700/258 |
| 2008/0246428 A1 | 10/2008 | Shimada | |
| 2008/0257042 A1 | 10/2008 | Tateyama et al. | |
| 2009/0069942 A1* | 3/2009 | Takahashi | B25J 9/1633 700/260 |
| 2009/0105878 A1* | 4/2009 | Nagasaka | B25J 13/084 700/245 |
| 2009/0120186 A1 | 5/2009 | Matsunuma | |
| 2009/0149993 A1 | 6/2009 | Neki et al. | |
| 2010/0037692 A1 | 2/2010 | Dube et al. | |
| 2010/0089155 A1 | 4/2010 | Sugihara et al. | |
| 2010/0113980 A1 | 5/2010 | Herr et al. | |
| 2010/0256812 A1 | 10/2010 | Tsusaka et al. | |
| 2010/0286823 A1 | 11/2010 | Neki et al. | |
| 2010/0318223 A1* | 12/2010 | Motoyoshi | B25J 9/1638 700/253 |
| 2011/0004343 A1* | 1/2011 | Iida | B25J 9/1638 700/253 |
| 2011/0082566 A1 | 4/2011 | Herr et al. | |
| 2011/0107866 A1 | 5/2011 | Oka et al. | |
| 2011/0166713 A1 | 7/2011 | Tsuji et al. | |
| 2011/0179867 A1 | 7/2011 | Amemiya | |
| 2011/0257785 A1 | 10/2011 | Nihei et al. | |
| 2012/0010748 A1 | 1/2012 | Sasai | |
| 2012/0035763 A1 | 2/2012 | Motoyoshi | |
| 2012/0048027 A1 | 3/2012 | Hashiguchi et al. | |
| 2012/0126664 A1 | 5/2012 | Ogura et al. | |
| 2012/0174317 A1 | 7/2012 | Saracen et al. | |
| 2012/0215356 A1* | 8/2012 | Igarashi | B25J 9/1641 700/258 |
| 2012/0215357 A1 | 8/2012 | Igarashi et al. | |
| 2012/0216613 A1 | 8/2012 | Honda | |
| 2012/0236507 A1 | 9/2012 | Koyama | |
| 2012/0272774 A1 | 11/2012 | Kirihara et al. | |
| 2012/0277912 A1 | 11/2012 | Kirihara | |
| 2012/0296471 A1 | 11/2012 | Inaba et al. | |
| 2013/0010412 A1 | 1/2013 | Shiraki et al. | |
| 2013/0041502 A1 | 2/2013 | Shi et al. | |
| 2013/0053866 A1 | 2/2013 | Leung et al. | |
| 2013/0073086 A1 | 3/2013 | Motoyoshi et al. | |
| 2013/0079929 A1 | 3/2013 | Lim et al. | |
| 2013/0131864 A1 | 5/2013 | Jody et al. | |
| 2013/0190926 A1* | 7/2013 | Motoyoshi | B25J 9/1653 700/254 |
| 2013/0204437 A1 | 8/2013 | Koselka et al. | |
| 2013/0263660 A1 | 10/2013 | Shibata | |
| 2014/0121837 A1 | 5/2014 | Hashiguchi et al. | |
| 2014/0249670 A1 | 9/2014 | Yamane | |
| 2014/0316564 A1 | 10/2014 | Nakamura et al. | |
| 2014/0368088 A1 | 12/2014 | Takahashi et al. | |
| 2014/0371908 A1 | 12/2014 | Kirihara | |
| 2015/0081092 A1 | 3/2015 | Jacobsen et al. | |
| 2015/0190925 A1 | 7/2015 | Hoffman et al. | |
| 2015/0190928 A1 | 7/2015 | Motoyoshi | |
| 2016/0008988 A1 | 1/2016 | Kennedy et al. | |
| 2016/0015461 A1 | 1/2016 | Farritor et al. | |
| 2016/0332303 A1 | 11/2016 | Kirihara | |

FOREIGN PATENT DOCUMENTS

| | | |
|---|---|---|
| EP | 2492064 A2 | 8/2012 |
| EP | 2703130 A2 | 3/2014 |
| EP | 2703131 A2 | 3/2014 |
| JP | 60-020214 A | 2/1985 |
| JP | 60-020888 | 2/1985 |
| JP | 62-212702 A | 9/1987 |
| JP | 63-003317 A | 1/1988 |
| JP | 01-103279 A | 4/1989 |
| JP | 06-505407 A | 6/1994 |
| JP | 07-314360 A | 12/1995 |
| JP | 10-197546 A | 7/1998 |
| JP | 2001-009772 A | 1/2001 |
| JP | 2003-114155 A | 4/2003 |
| JP | 2004-354160 A | 12/2004 |
| JP | 2007-040766 A | 2/2007 |
| JP | 2007-314026 A | 12/2007 |
| JP | 2008-058062 A | 3/2008 |
| JP | 2009-275837 A | 11/2009 |
| JP | 2011-005608 A | 1/2011 |
| JP | 2011-085441 A | 4/2011 |
| JP | 2011-136395 A | 7/2011 |
| JP | 2012-035361 A | 2/2012 |
| JP | 2012-139770 A | 7/2012 |
| JP | 2012-232370 A | 11/2012 |
| WO | WO-92-13504 A1 | 8/1992 |
| WO | WO-2010-019310 A1 | 2/2010 |
| WO | WO-2010-032493 A1 | 3/2010 |

OTHER PUBLICATIONS

Analog Devices, "ADIS16120," 2007, Rev.B, pp. 1-12.
Wilcoxon Research "Vibration sensor wiring and cabling," Aug. 2008, pp. 1-12.
Extended European Search Report for Application No. EP 14162332.2 dated Feb. 4, 2016 (9 pages).
Extended European Search Report for Application No. EP 13182172.0 dated Feb. 11, 2016 (7 pages).

* cited by examiner

ROBOT, ROBOT CONTROL DEVICE, AND ROBOT SYSTEM

CROSS-REFERENCE TO RELATED APPLICATIONS

This application is a continuation of U.S. patent application Ser. No. 14/197,692 filed Mar. 5, 2014, which claims priority to Japanese Patent Application No. 2013-118670 filed Jun. 5, 2013, both of which are hereby expressly incorporated by reference herein in their entireties.

BACKGROUND

1. Technical Field

The present invention relates to a robot, a robot control device, and a robot system.

2. Related Art

In a robot described in JP-A-2011-136395, a six-axis sensor which detects accelerations in the directions of an X axis, a Y axis, and a Z axis orthogonal to each other and accelerations around the X axis, the Y axis, and the Z axis is provided in a front end portion, that is, a sixth link on a front-most end side. A vibrational component of angular velocity around an intended axis is obtained for each link on the basis of the detection result of the six-axis sensor. As such, control for suppressing vibration is performed. The vibrational component of the angular velocity of the link is called "torsional angular velocity", "vibrational angular velocity", or the like.

In the robot described in JP-A-2011-136395, since the posture of the six-axis sensor changes with the motion of the robot, it is necessary to perform coordinate axis transformation or the like, called Jacobi's transformation, from the detection result of the six-axis sensor, and to obtain the vibrational component of the angular velocity of each link. Moreover, it is necessary to perform computation in conformity with the rotation angle of a motor which changes every moment.

Since complicated and enormous computation processing is required, there is a problem in that a control device which has a high-performance and an expensive CPU (Central Processing Unit) or the like is required. This causes an increase in cost.

Also, since the complicated and enormous computation processing is required, there is a problem in that a computation error is likely to occur. If such an error occurs, it is not possible to sufficiently suppress vibration due to the computation error.

SUMMARY

An advantage of some aspects of the invention is that it provides a robot, a robot control device, and a robot system capable of suppressing vibration easily and reliably.

An aspect of the invention is directed to a robot including a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, a first angular velocity sensor which is provided in the first arm, and a second angular velocity sensor which is provided in the third arm, in which the angle between a detection axis of the first angular velocity sensor and the first rotating axis is a predetermined first angle, and the angle between a detection axis of the second angular velocity sensor and the third rotating axis is a predetermined second angle.

With this configuration, it is possible to suppress vibration easily and reliably.

That is, first, the angular velocity of the first arm can be detected by the first angular velocity sensor. Since the third rotating axis is parallel to the second rotating axis, the angular velocity of the third arm including the rotation amount of the second arm can be detected by the second angular velocity sensor. Then, it is possible to suppress vibration on the basis of these detection results.

Since the angular velocity of the third arm including the rotation amount of the second arm is detected by the second angular velocity sensor instead of the angular velocity of the second arm, it is possible to suppress vibration more reliably.

It is possible to reduce the number of angular velocity sensors, to reduce cost, and to simplify the configuration of the robot compared to a case where an angular velocity sensor is also provided in the second arm.

In the robot according to the aspect of the invention, it is preferable that the first angle is 0°, and the second angle is 0°.

With this configuration, even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Since the third rotating axis and the second rotating axis are orthogonal to the first rotating axis or are parallel to the axis orthogonal to the first rotating axis, even if the posture of the robot changes, for example, even if the first arm rotates or the second arm rotates, the detection axis of the angular velocity of the second angular velocity sensor is constant. For this reason, it is not necessary to correct the angular velocity of the third arm detected by the second angular velocity sensor with the direction of the second angular velocity sensor.

Accordingly, complicated and enormous computation is not required. Therefore, a computation error is less likely to occur, and it is possible to reliably suppress vibration and to increase a response speed in the control of the robot.

In the robot according to the aspect of the invention, it is preferable that the first angle is greater than 0° and equal to or smaller than 15°, and the second angle is greater than 0° and equal to or smaller than 15°.

With this configuration, a computation error is less likely to occur, and it is possible to suppress vibration reliably.

In the robot according to the aspect of the invention, it is preferable that the first angular velocity sensor is an angular velocity sensor which detects the angular velocity around the first rotating axis of the first arm, and the second angular velocity sensor is an angular velocity sensor which detects a composite angular velocity of the angular velocity around the second rotating axis of the second arm and the angular velocity around the third rotating axis of the third arm.

With this configuration, it is possible to detect the angular velocity of the first arm and the angular velocity of the third arm with high precision.

In the robot according to the aspect of the invention, it is preferable that an "a" axis orthogonal to the first rotating axis and a "b" axis orthogonal to both the first rotating axis and the a axis are set, and when the angle between the detection axis of the first angular velocity sensor and the first rotating axis around the a axis is $\alpha 1$, the angle between the detection axis of the first angular velocity sensor and the first rotating axis around the b axis is $\beta 1$, and the angular velocity which is detected by the first angular velocity sensor with the rotation around the first rotating axis of the first arm is $\omega 1$, the angular velocity around the first rotating axis of the first arm is output as $\omega 1 \cos \alpha 1 \cos \beta 1$.

With this configuration, complicated and enormous computation is not required, a computation error is less likely to occur, and it is possible to reliably suppress vibration and to increase a response speed in the control of the robot.

In the robot according to the aspect of the invention, it is preferable that a "c" axis orthogonal to the second rotating axis and a "d" axis orthogonal to both the second rotating axis and the c axis are set, and when the angle between the detection axis of the second angular velocity sensor and the second rotating axis around the c axis is $\alpha 2$, the angle between the detection axis of the second angular velocity sensor and the second rotating axis around the d axis is $\beta 2$, and the angular velocity which is detected by the second angular velocity sensor with the rotation around the second rotating axis of the third arm is $\omega 2$, the angular velocity around the second rotating axis of the second arm is output as $\omega 2 \cos \alpha 2 \cos \beta 2$.

With this configuration, complicated and enormous computation is not required, a computation error is less likely to occur, and it is possible to reliably suppress vibration and to increase a response speed in the control of the robot.

In the robot according to the aspect of the invention, it is preferable that the second angular velocity sensor is arranged in the first arm through a first posture adjustment mechanism, and the second angular velocity sensor is arranged in the third arm through a second posture adjustment mechanism.

With this configuration, it is possible to adjust the posture of each of the first and second angular velocity sensors.

It is preferable that the robot according to the aspect of the invention further includes a first angular velocity sensor unit having a first housing, and the first angular velocity sensor and a circuit unit which are provided in the first housing, the circuit unit AD converting and transmitting a signal output from the first angular velocity sensor, and a second angular velocity sensor unit having a second housing, and the second angular velocity sensor and a circuit unit which are provided in the second housing, the circuit unit AD converting and transmitting a signal output from the second angular velocity sensor, in which the first angular velocity sensor unit is provided in the first arm, and the second angular velocity sensor unit is provided in the third arm.

With this configuration, it is possible to simplify the configuration compared to a case where the circuit unit is provided separately.

In the robot according to the aspect of the invention, it is preferable that the appearance of each of the first housing and the second housing is a rectangular parallelepiped, the detection axis of the first angular velocity sensor matches (is aligned with) the normal to the largest surface of the rectangular parallelepiped of the first housing, and the detection axis of the second angular velocity sensor matches (is aligned with) the normal to the largest surface of the rectangular parallelepiped of the second housing.

With this configuration, it is possible to allow the directions of the detection axis of the first angular velocity sensor and the detection axis of the second angular velocity sensor to be recognized easily and reliably, and to allow the first angular velocity sensor and the second angular velocity sensor to take an appropriate posture easily.

In the robot according to the aspect of the invention, it is preferable that the first housing has an attachment portion to be attached to the first arm in a corner portion of the first housing, and the second housing has an attachment portion to be attached to the third arm in a corner portion of the second housing.

With this configuration, it is possible to attach the first angular velocity sensor unit to the first arm reliably, and to attach the second angular velocity sensor unit to the third arm reliably.

It is preferable that the robot according to the aspect of the invention further includes a fixing member which is conductive and fixes the attachment portion of the first housing to the first arm, the circuit unit of the first angular velocity sensor unit being grounded to the first arm by the fixing member, and a fixing member which is conductive and fixes the attachment portion of the second housing to the third arm, the circuit unit of the second angular velocity sensor unit being grounded to the third arm by the fixing member.

With this configuration, it is possible to reduce the number of components and to simplify the configuration.

In the robot according to the aspect of the invention, it is preferable that the first arm has a housing and an arm-side attachment portion formed integrally with the housing, and the first angular velocity sensor unit is attached directly to the arm-side attachment portion.

With this configuration, it is possible to allow the first angular velocity sensor unit to rotate integrally with the first arm reliably.

In the robot according to the aspect of the invention, it is preferable that the third arm has a housing and an arm-side attachment portion formed integrally with the housing, and the second angular velocity sensor unit is attached directly to the arm-side attachment portion.

With this configuration, it is possible to allow the second angular velocity sensor unit to rotate integrally with the third arm reliably.

It is preferable that the robot according to the aspect of the invention further includes a cable which is provided in the first arm and supplies power to the robot, in which the first angular velocity sensor is arranged in an end portion of the first arm on an opposite side to the cable.

With this configuration, it is possible to prevent the first angular velocity sensor from being affected by noise from the cable, and to prevent a circuit or a wiring on the first angular velocity sensor side from being short-circuited by the cable.

It is preferable that the robot according to the aspect of the invention further includes a cable which is provided in the third arm and supplies power to the robot, in which the second angular velocity sensor is arranged in an end portion of the third arm on an opposite side to the cable.

With this configuration, it is possible to prevent the second angular velocity sensor from being affected by noise from the cable, and to prevent a circuit or a wiring on the second angular velocity sensor side from being short-circuited by the cable.

It is preferable that the robot according to the aspect of the invention further includes a fourth arm which is connected to the third arm rotatably around a fourth rotating axis, which is an axis orthogonal to the third rotating axis or an axis parallel to the axis orthogonal to the third rotating axis, as a rotation center, a fifth arm which is connected to the fourth arm rotatably around a fifth rotating axis, which is an axis orthogonal to the fourth rotating axis or an axis parallel to the axis orthogonal to the fourth rotating axis, as a rotation center, and a sixth arm which is connected to the fifth arm rotatably around a sixth rotating axis, which is an axis orthogonal to the fifth rotating axis or an axis parallel to the axis orthogonal to the fifth rotating axis, as a rotation center.

With this configuration, a more complicated motion can be easily performed.

In the robot according to the aspect of the invention, it is preferable that the first rotating axis matches (is aligned with) the normal to an installation surface of the base.

With this configuration, it is possible to easily control the robot.

Another aspect of the invention is directed to a robot including a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, a first angular velocity sensor which is provided in the first arm, and a second angular velocity sensor which is provided in the second arm, in which the angle between a detection axis of the first angular velocity sensor and the first rotating axis is a predetermined first angle, and the angle between a detection axis of the second angular velocity sensor and the third rotating axis is a predetermined second angle.

With this configuration, it is possible to suppress vibration easily and reliably.

That is, first, the angular velocity of the first arm can be detected by the first angular velocity sensor. Since the third rotating axis is parallel to the second rotating axis, the angular velocity of the third arm including the rotation amount of the second arm can be detected by the second angular velocity sensor. Then, it is possible to suppress vibration on the basis of these detection results.

Since the angular velocity of the third arm including the rotation amount of the second arm is detected by the second angular velocity sensor instead of the angular velocity of the second arm, it is possible to suppress vibration more reliably.

It is possible to reduce the number of angular velocity sensors, to reduce cost, and to simplify the configuration of the robot compared to a case where an angular velocity sensor is also provided in the second arm.

Still another aspect of the invention is directed to a robot control device which controls the actuation of a robot, in which the robot includes a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, a first angular velocity sensor which is provided in the first arm, and a second angular velocity sensor which is provided in the third arm, the angle between a detection axis of the first angular velocity sensor and the first rotating axis is a predetermined first angle, the angle between a detection axis of the second angular velocity sensor and the third rotating axis is a predetermined second angle, and the robot control device includes a receiving unit which receives a first signal output from the first angular velocity sensor provided in the first arm and a second signal output from the second angular velocity sensor provided in the third arm, a calculation unit which obtains a vibrational component of the first arm and a vibrational component of the third arm on the basis of the first signal and the second signal received by the receiving unit, and a control unit which controls the actuation of the robot on the basis of the vibrational component of the first arm and the vibrational component of the third arm obtained by the calculation unit.

With this configuration, it is possible to suppress vibration easily and reliably.

That is, first, the vibrational component of the angular velocity of the first arm can be obtained by the calculation unit on the basis of the angular velocity of the first arm detected by the first angular velocity sensor. Since the third rotating axis is parallel to the second rotating axis, the vibrational component of the angular velocity of the third arm including the vibrational component of the angular velocity of the second arm can be obtained by the calculation unit on the basis of the angular velocity of the third arm including the rotation amount of the second arm detected by the second angular velocity sensor. Then, it is possible to suppress vibration on the basis of the vibrational component of the angular velocity of the first arm and the vibrational component of the angular velocity of the third arm.

Since the vibrational component of the angular velocity of the third arm including the vibrational component of the angular velocity of the second arm is obtained by the calculation unit on the basis of the angular velocity of the third arm including the rotation amount of the second arm detected by the second angular velocity sensor, instead of the vibrational component of the angular velocity of only the second arm, it is possible to suppress vibration more reliably.

Yet another aspect of the invention is directed to a robot system including the robot according to the aspect of the invention, and a robot control device which controls the actuation of the robot.

With this configuration, it is possible to suppress vibration easily and reliably.

That is, first, the angular velocity of the first arm can be detected by the first angular velocity sensor. Since the third rotating axis is parallel to the second rotating axis, the angular velocity of the third arm including the rotation amount of the second arm can be detected by the second angular velocity sensor. Then, it is possible to suppress vibration on the basis of these detection results.

Since the angular velocity of the third arm including the rotation amount of the second arm is detected by the second angular velocity sensor instead of the angular velocity of the second arm, it is possible to suppress vibration more reliably.

It is possible to reduce the number of angular velocity sensors, to reduce cost, and to simplify the configuration of the robot compared to a case where an angular velocity sensor is also provided in the second arm.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a robot, a robot control device, and a robot system according to the invention will be described in detail on the basis of a preferred embodiment shown in the accompanying drawings.

First Embodiment

Figure 1:
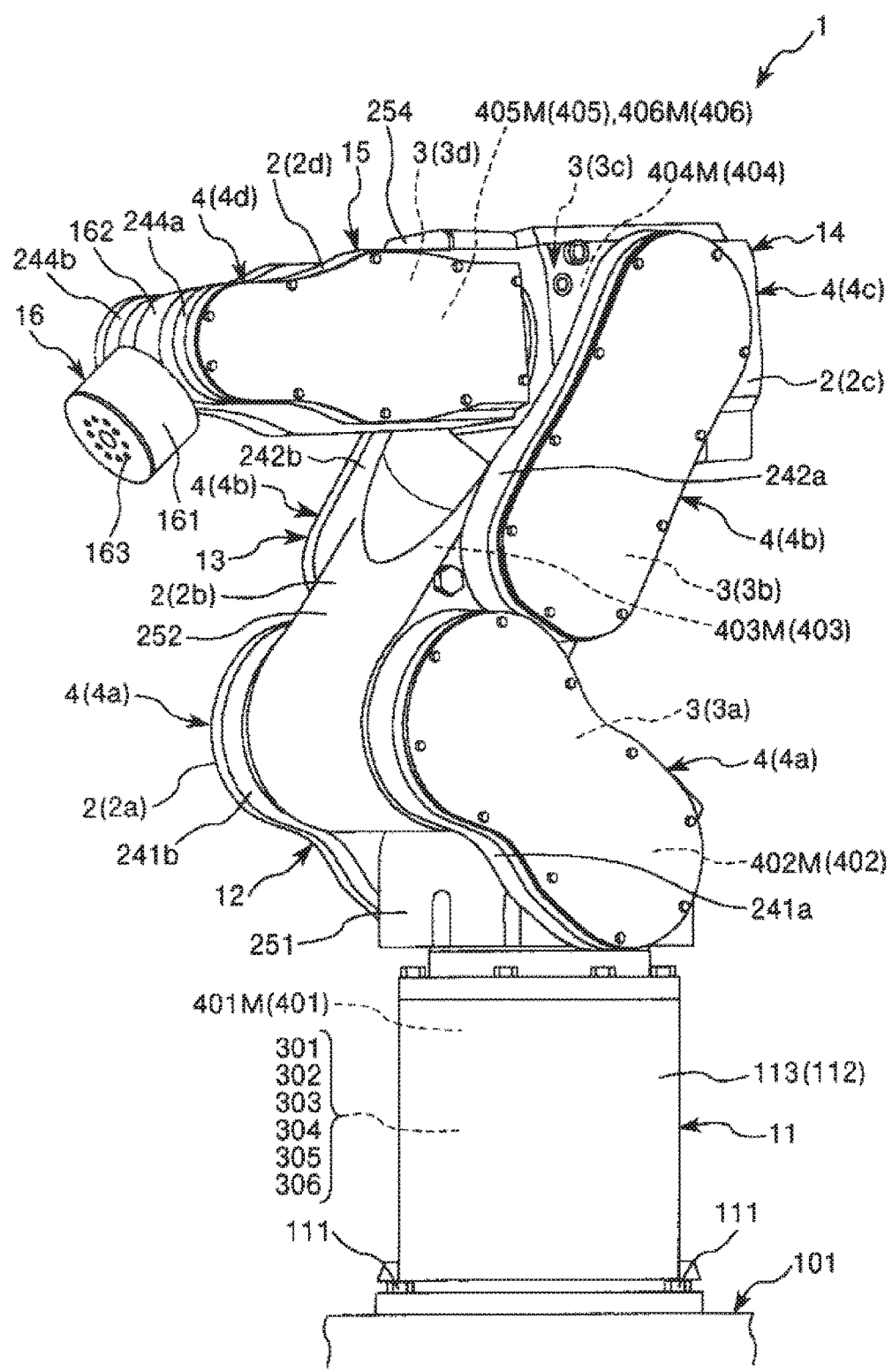
FIG. 1 is a perspective view when a robot according to a first embodiment of the invention is viewed from a front side.
Figure 2:
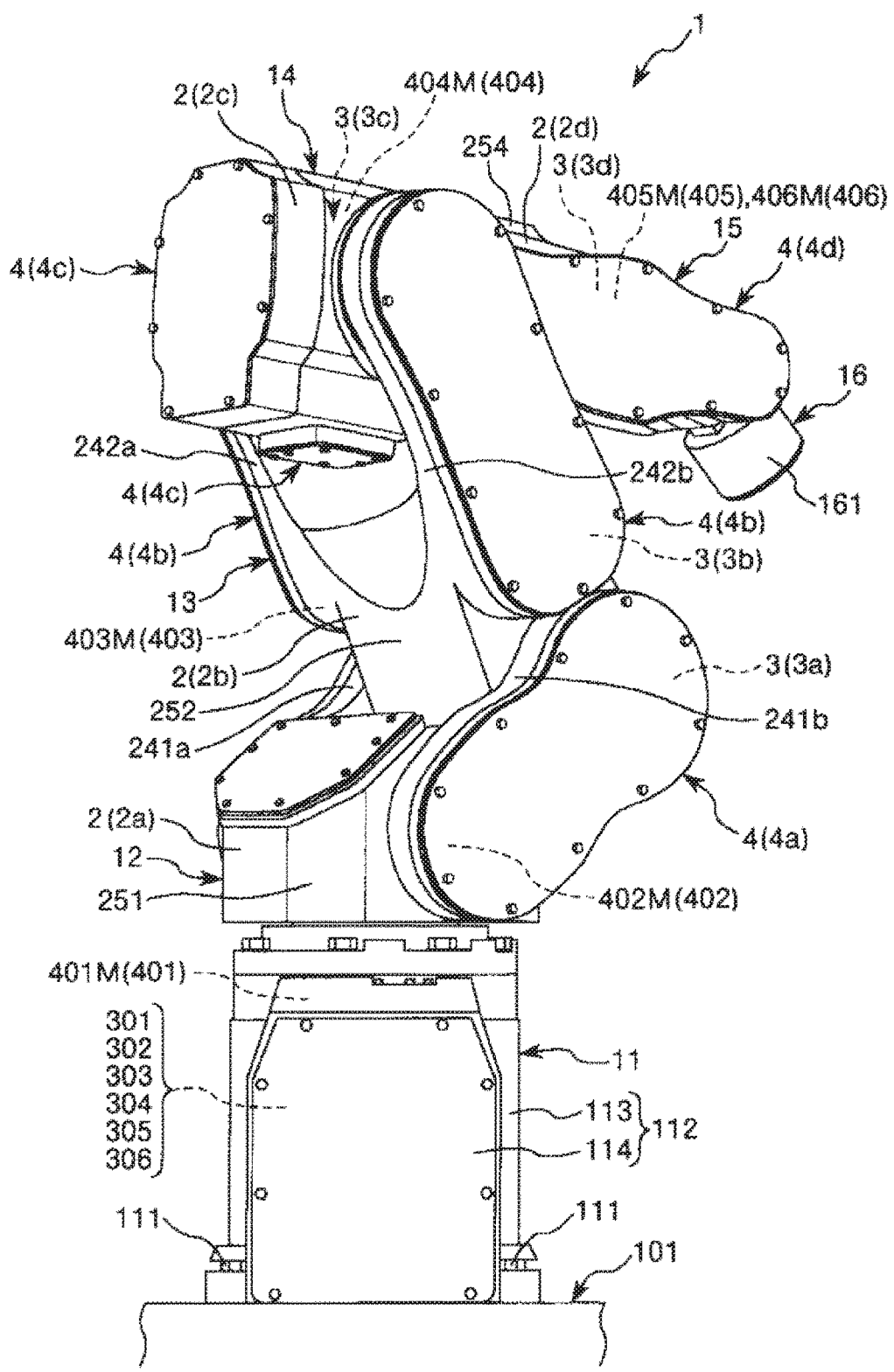
FIG. 2 is a perspective view when the robot shown in FIG. 1 is viewed from a rear side.
Figure 3:
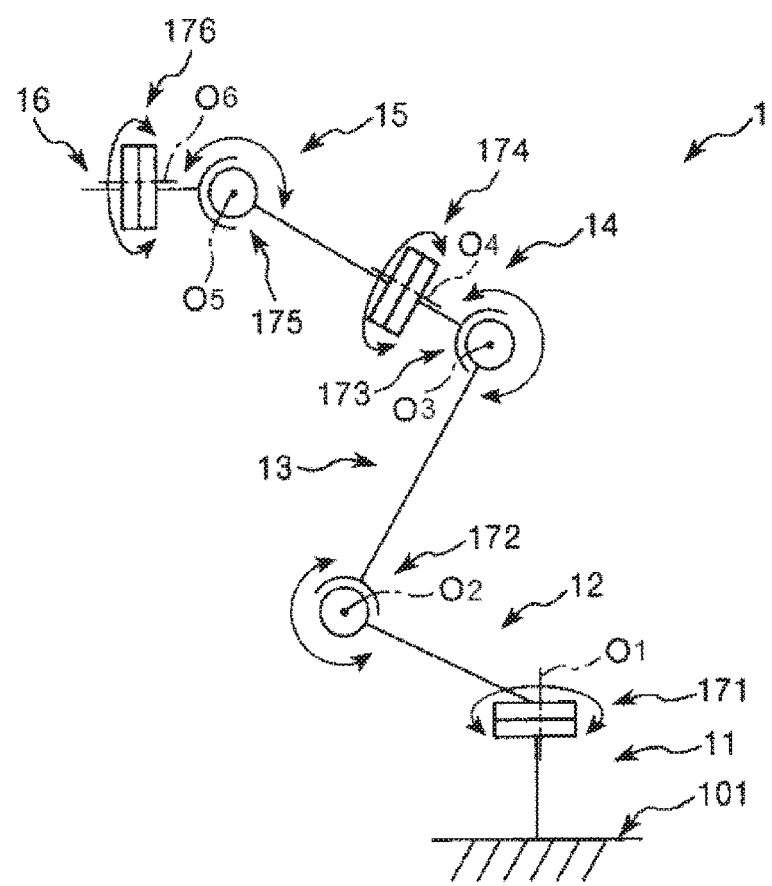
FIG. 3 is a schematic view of the robot shown in FIG. 1.
Figure 4:
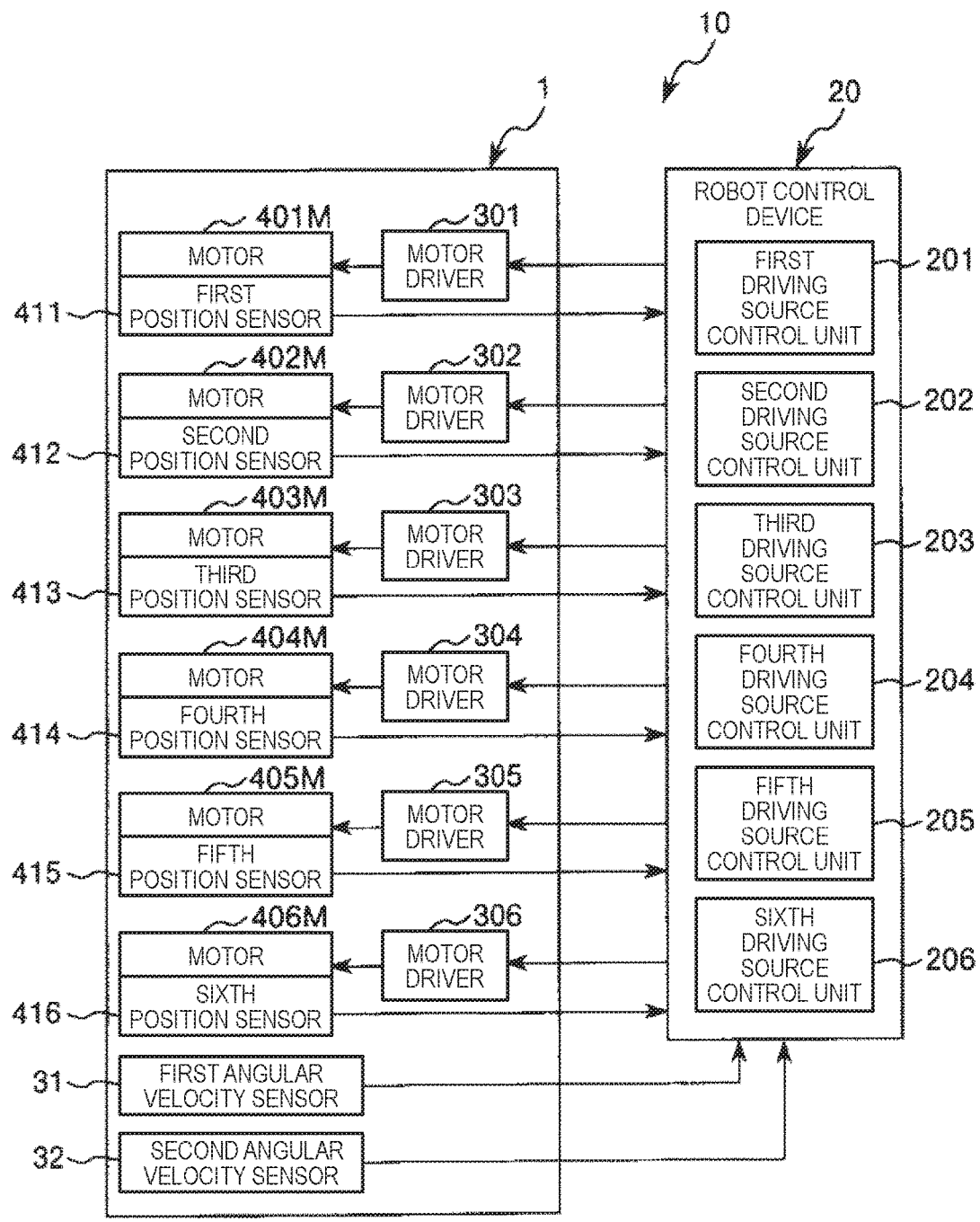
FIG. 4 is a block diagram of a part of a robot system having the robot shown in FIG. 1.
Figure 5:
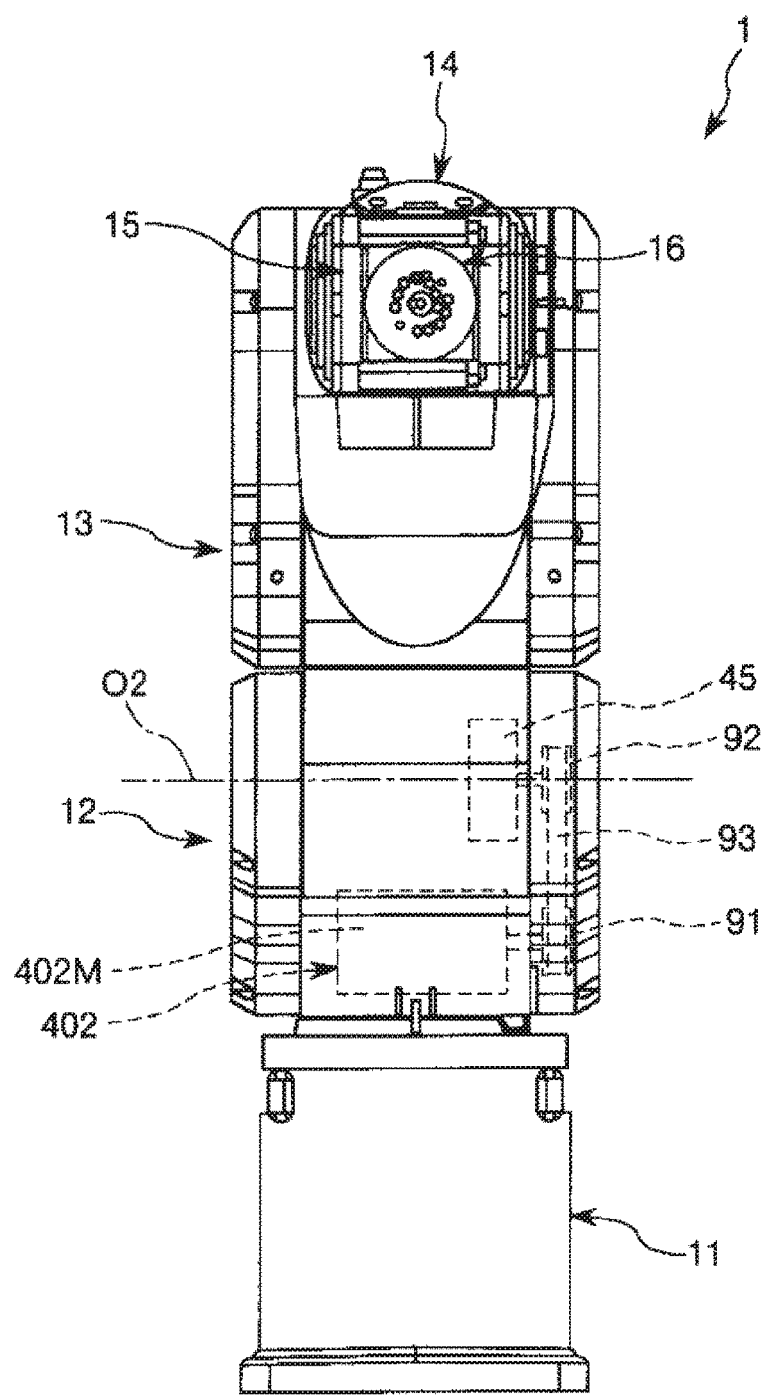
FIG. 5 is a front view of the robot shown in FIG. 1.
Figure 6:
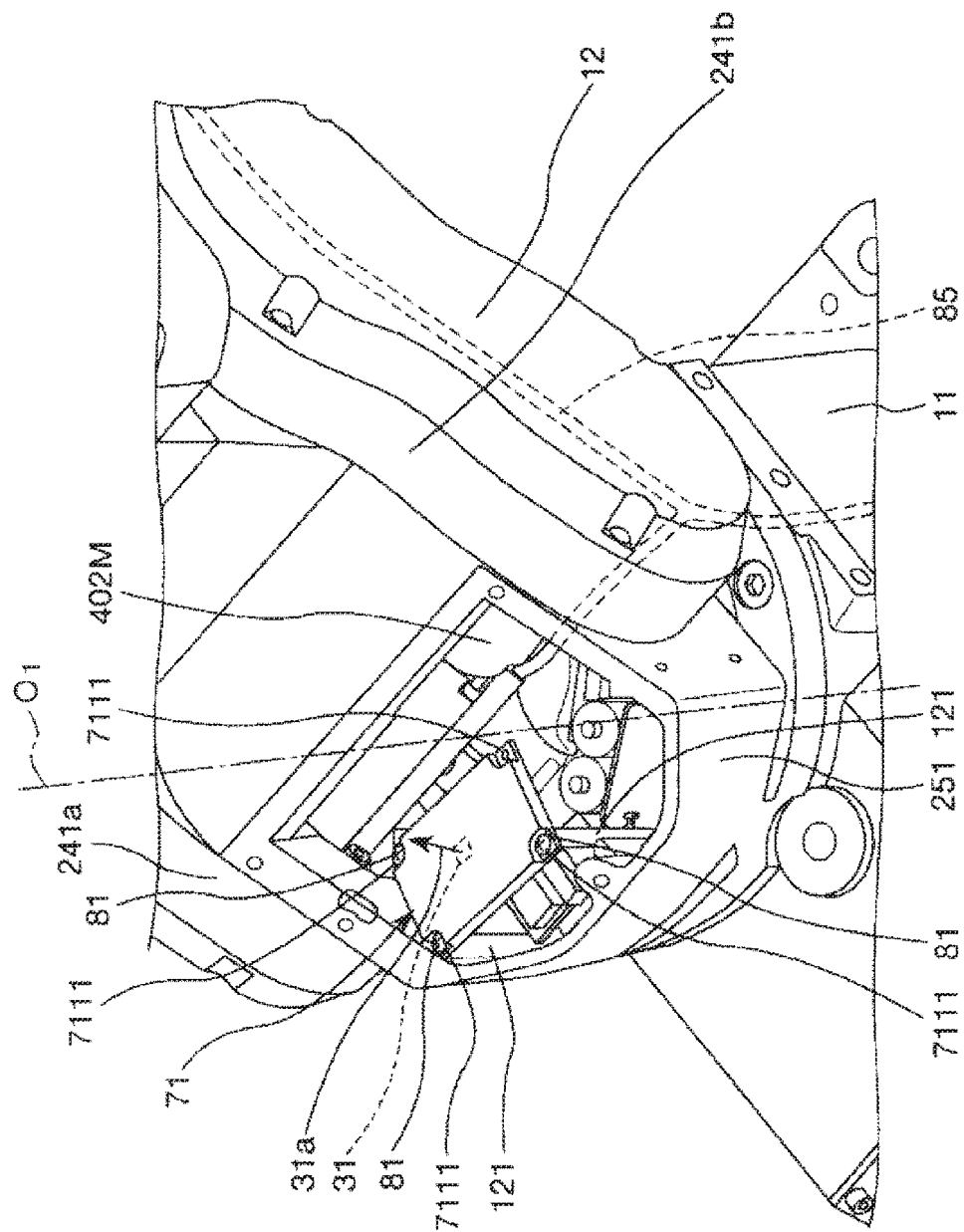
FIG. 6 is a diagram showing the vicinity of a first angular velocity sensor in a first arm of the robot shown in FIG. 1.
Figure 7:
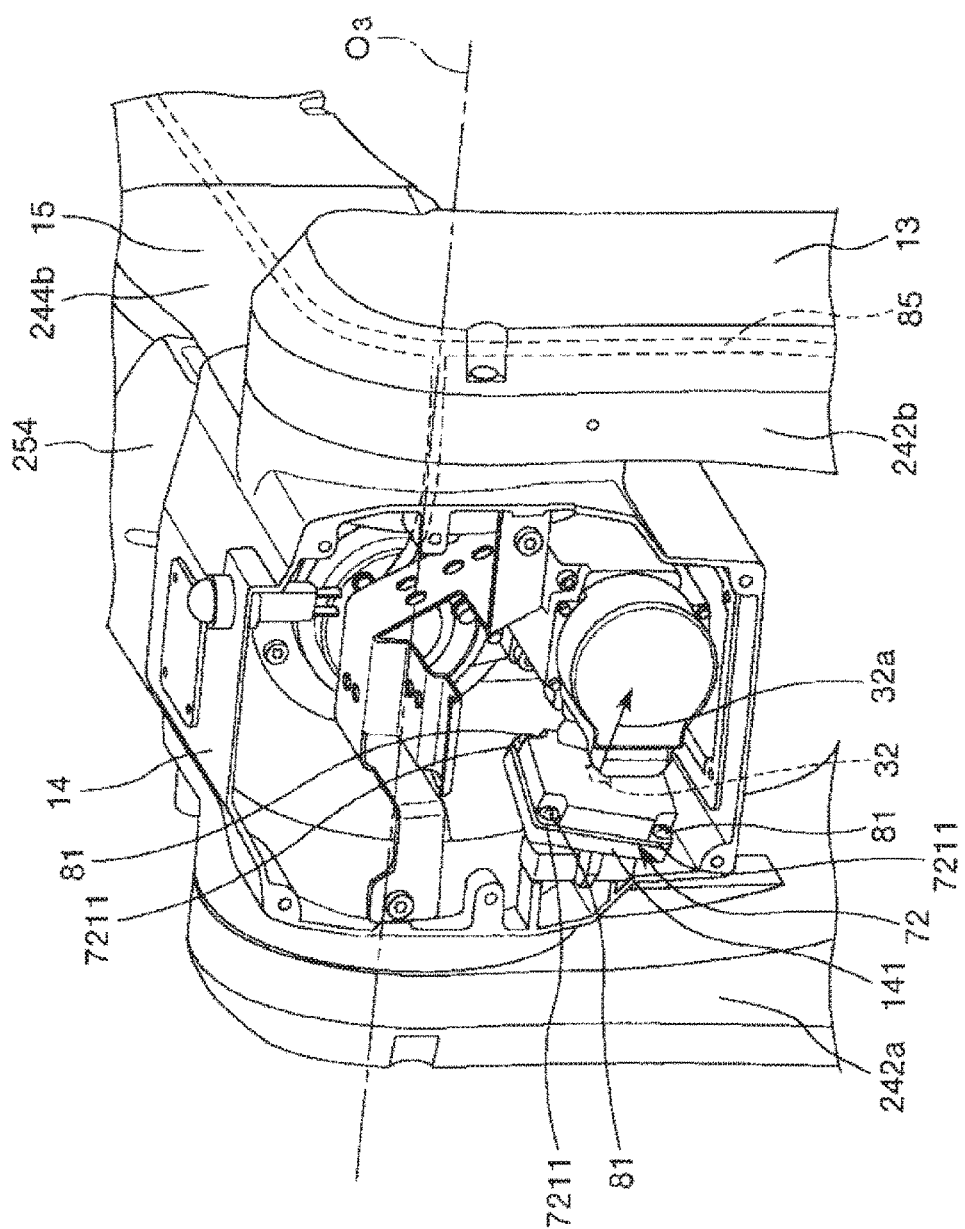
FIG. 7 is a diagram showing the vicinity of a speed reducer in a third arm of the robot shown in FIG. 1.
Figure 8:
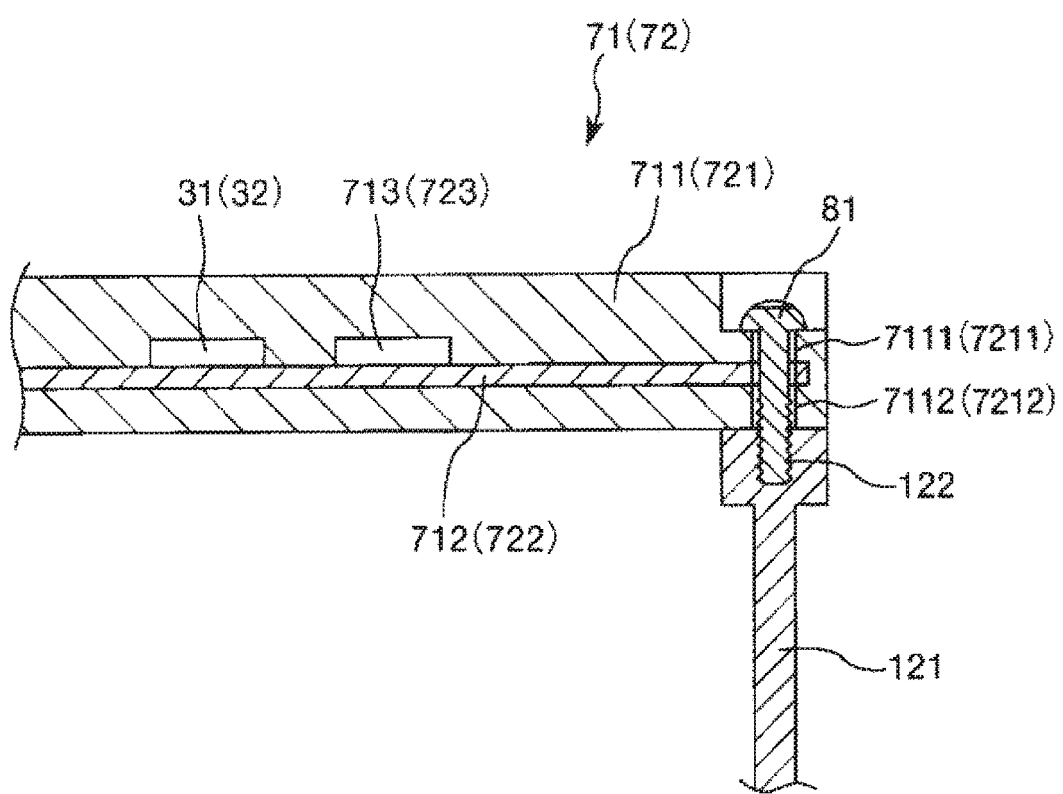
FIG. 8 is a sectional view of a first angular velocity sensor unit of the robot shown in FIG. 1.
Figure 9:
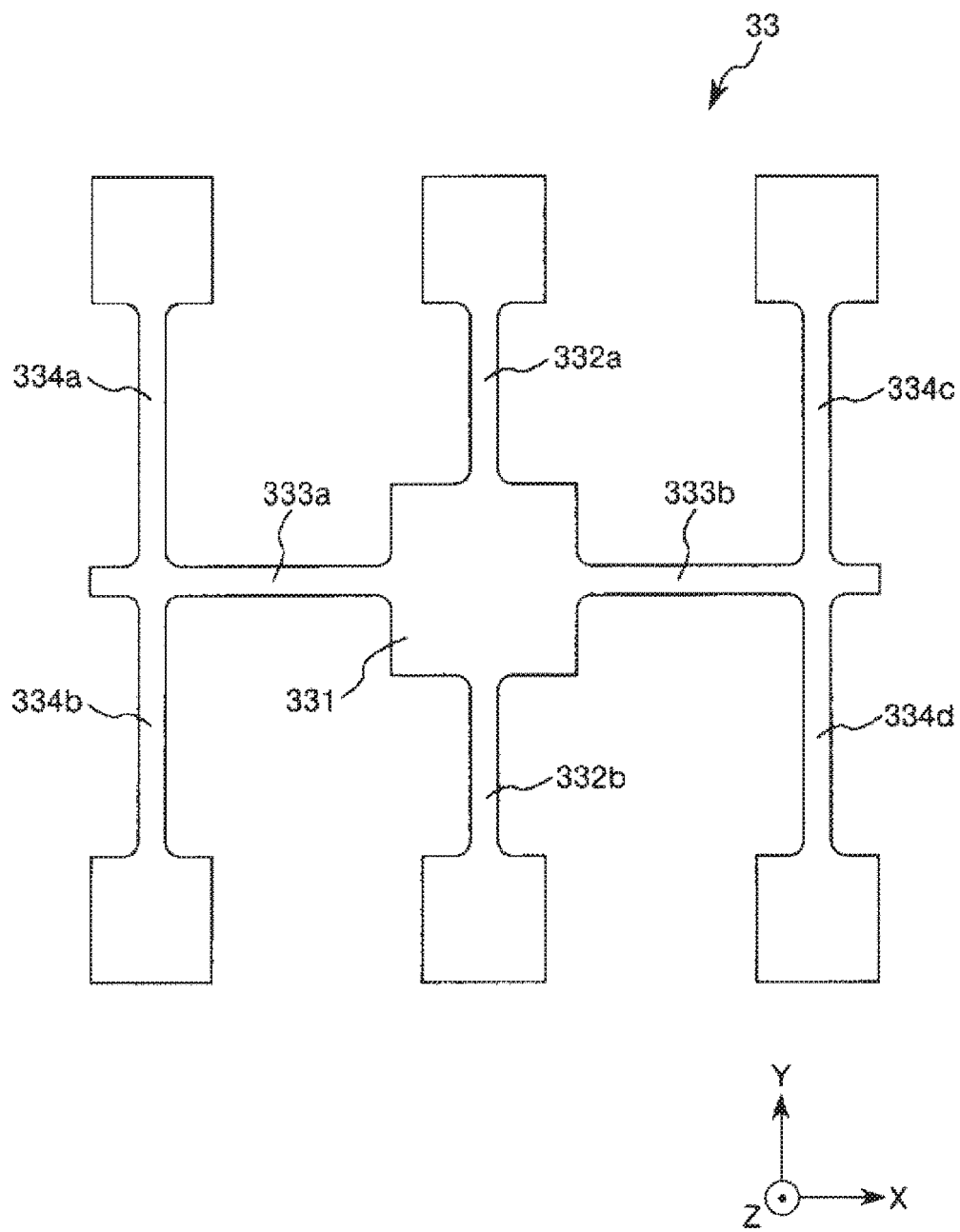
FIG. 9 is a plan view of a gyro element in an angular velocity sensor.
Figure 10A:
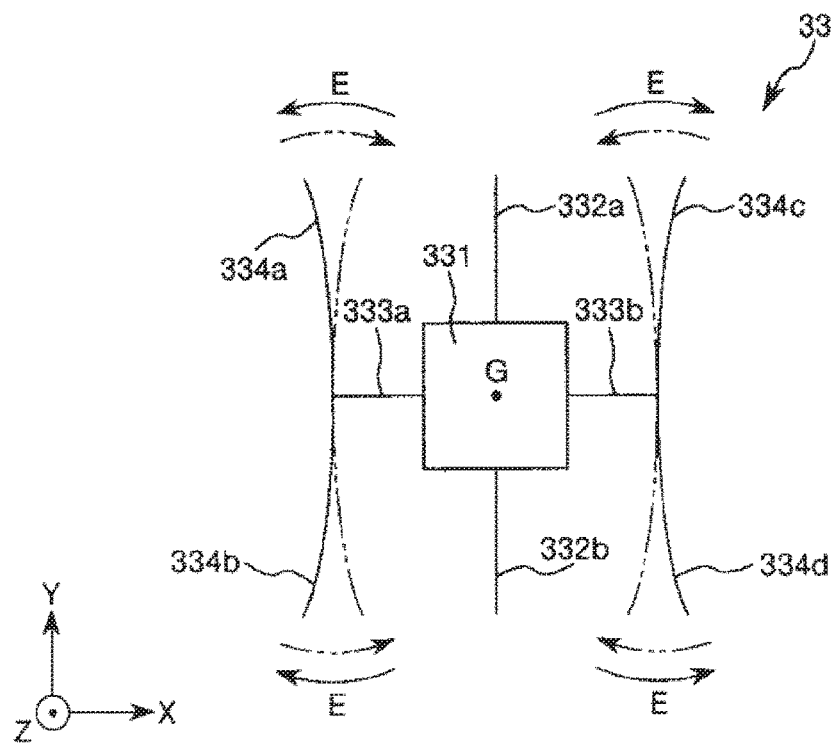
FIGS. 10A and 10B are diagrams showing the actuation of the gyro element shown in FIG. 9.
Figure 10B:
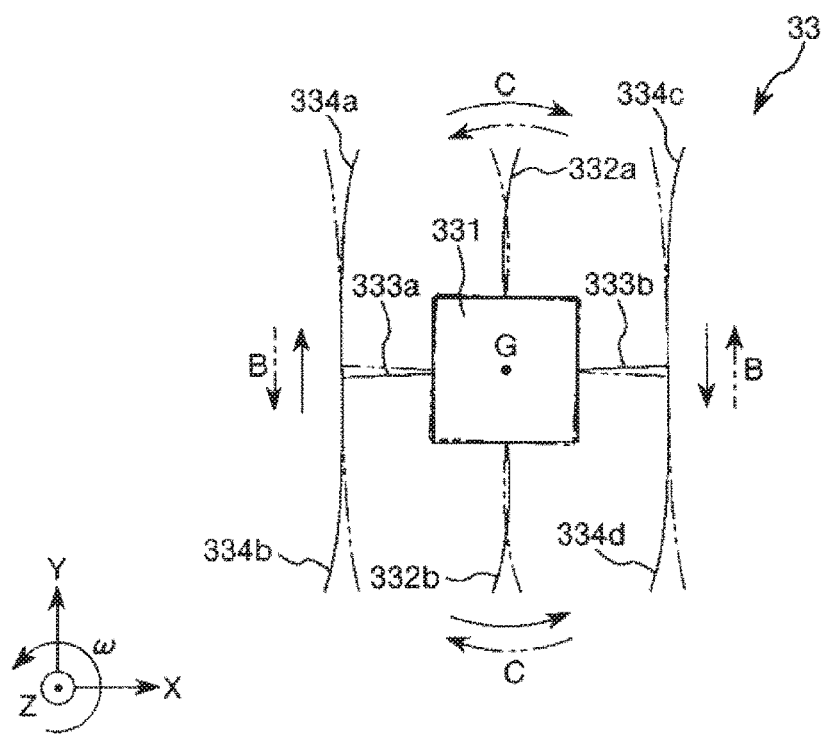
Figure 11A:
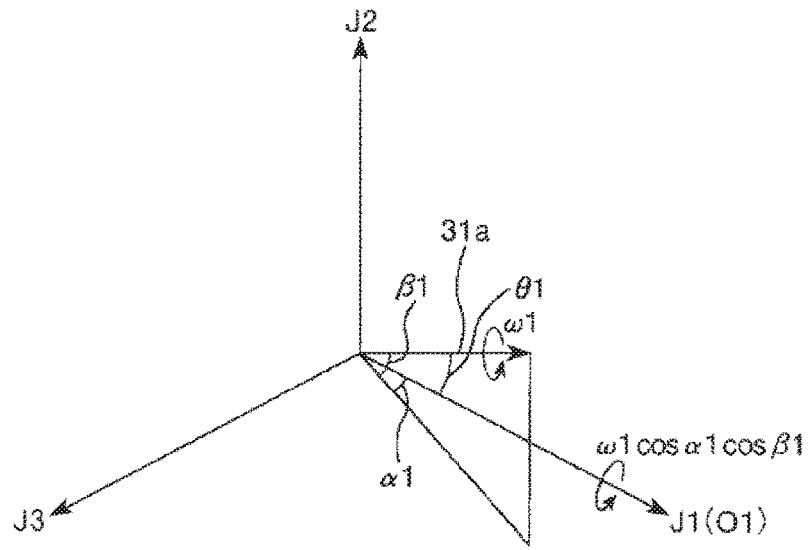
FIGS. 11A and 11B are diagrams showing the slope between a detection axis of an angular velocity sensor and a rotating axis of an arm.
Figure 11B:
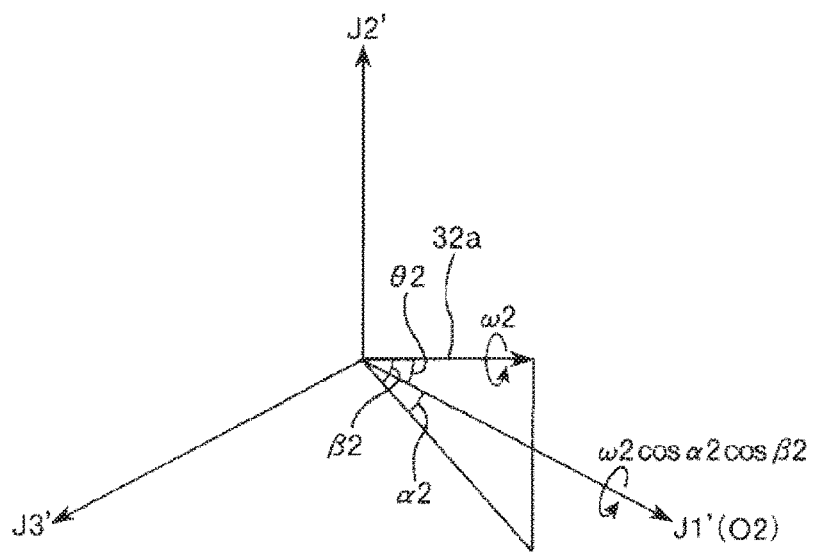

FIG. 1 is a perspective view when a robot according to a first embodiment of the invention is viewed from a front side. FIG. 2 is a perspective view when the robot shown in FIG. 1 is viewed from a rear side. FIG. 3 is a schematic view of the robot shown in FIG. 1. FIG. 4 is a block diagram of apart of a robot system having the robot shown in FIG. 1. FIG. 5 is a front view of the robot shown in FIG. 1. FIG. 6 is a diagram showing the vicinity of a first angular velocity sensor in a first arm of the robot shown in FIG. 1. FIG. 7 is a diagram showing the vicinity of a speed reducer in a third arm of the robot shown in FIG. 1. FIG. 8 is a sectional view of a first angular velocity sensor unit of the robot shown in FIG. 1. FIG. 9 is a plan view of a gyro element in an angular velocity sensor. FIGS. 10A and 10B are diagrams showing the actuation of the gyro element shown in FIG. 9. FIGS. 11A and 11B are diagrams showing the slope between a detection axis of an angular velocity sensor and a rotating axis of an arm. FIGS. 12 to 16 are block diagrams of a part of the robot shown in FIG. 1.

Hereinafter, for convenience of description, the upper side in FIGS. 1 to 3 and 5 to 8 is referred to as "up" or "upward", and the lower side is referred to as "down" or "downward". The base side in FIGS. 1 to 3 and 5 to 7 is referred to as "base end", and the opposite side is referred to as "front end". In FIG. 8, reference numerals of the respective units of a second angular velocity sensor unit are written in parentheses corresponding to a first angular velocity sensor unit, and a diagram of the second angular velocity sensor unit is omitted.

A robot system (industrial robot system) 10 shown in FIGS. 1 to 4 can be used in, for example, a manufacturing process for manufacturing precision equipment, such as a wristwatch, and has a robot (industrial robot) 1, and a robot control device (control unit) 20 (see FIG. 4) which controls the actuation of the robot 1. The robot 1 and the robot control device 20 are electrically connected together. The robot control device 20 can be constituted by, for example, a personal computer (PC) embedded with a CPU (Central Processing Unit) or the like. The robot control device 20 will be described below in detail.

The robot 1 includes a base 11, four arms (links) 12, 13, 14, and 15, a wrist (link) 16, and six driving sources 401, 402, 403, 404, 405, and 406. The robot 1 is a vertical articulated (six-axis) robot (robot body) in which the base 11, the arms 12, 13, 14, and 15, and the wrist 16 are connected in this order from the base end to the front end. In the vertical articulated robot, the base 11, the arms 12 to 15, and the wrist 16 may be collectively referred to as "arm", the arm 12 may be referred to as a "first arm", the arm 13 may be referred to as a "second arm", the arm 14 may be referred to as a "third arm", the arm 15 may be referred to as a "fourth arm", and the wrist 16 may be referred to as "fifth arm and sixth arm", separately. In this embodiment, the wrist 16 has the fifth arm and the sixth arm. An end effector or the like can be attached to the wrist 16.

The arms 12 to 15 and the wrist 16 are supported to be separately displaceable with respect to the base 11. Although the length of each of the arms 12 to 15 and the wrist is not particularly limited, and in the illustrated configuration, the length of each of the first arm 12, the second arm 13, and the fourth arm 15 is set to be longer than the third arm 14 and the wrist 16.

The base 11 and the first arm 12 are connected together through a joint 171. The first arm 12 has a first rotating axis O1 parallel to a vertical direction as a rotation center with respect to the base 11, and is rotatable around the first rotating axis O1. The first rotating axis O1 matches (is aligned with) the normal to a top surface of a floor 101 which is an installation surface of the base 11. The rotation around the first rotating axis O1 is performed by driving of the first driving source 401 having a motor 401M. The first driving source 401 is driven by the motor 401M and a cable (not shown), and the motor 401M is controlled by the robot control device 20 through a motor driver 301 electrically connected to the motor 401M (see FIG. 4). Although the first driving source 401 may be configured to transmit a driving force from the motor 401M by a speed reducer (not shown) provided along with the motor 401M or a speed reducer may be omitted, in this embodiment, the first driving source 401 has a speed reducer.

The first arm 12 and the second arm 13 are connected together through a joint 172. The second arm 13 is rotatable around a second rotating axis O2 as an axial center parallel to a horizontal direction with respect to the first arm 12. The second rotating axis O2 is orthogonal to the first rotating axis O1. The rotation around the second rotating axis O2 is performed by driving of the second driving source 402 having a motor 402M. The second driving source 402 is driven by the motor 402M and a cable (not shown), and the motor 402M is controlled by the robot control device 20 through a motor driver 302 electrically connected to the motor 402M (see FIG. 4). Although the second driving source 402 may be configured to transmit a driving force from the motor 402M by a speed reducer 45 (see FIG. 5) provided along with the motor 402M or a speed reducer may be omitted, in this embodiment, the second driving source 402 has the speed reducer 45. The second rotating axis O2 may be parallel to an axis orthogonal to the first rotating axis O1.

The second arm 13 and the third arm 14 are connected together through a joint 173. The third arm 14 has a third rotating axis O3 parallel to the horizontal direction as a rotation center with respect to the second arm 13, and is rotatable around the third rotating axis O3. The third rotating axis O3 is parallel to the second rotating axis O2. The rotation around the third rotating axis O3 is performed by driving of the third driving source 403. The third driving source 403 is driven by a motor 403M and a cable (not shown), and the motor 403M is controlled by the robot control device 20 through a motor driver 303 electrically connected to the motor 403M (see FIG. 4). Although the third driving source 403 may be configured to transmit a driving force from the motor 403M by the speed reducer 45 provided along with the motor 403M or a speed reducer may be omitted, in this embodiment, the third driving source 403 has the speed reducer 45.

The third arm 14 and the fourth arm 15 are connected together through a joint 174. The fourth arm 15 has a fourth rotating axis O4 parallel to a center axis direction of the third arm 14 as a rotation center with respect to the third arm 14 (base 11), and is rotatable around the fourth rotating axis O4. The fourth rotating axis O4 is orthogonal to the third rotating axis O3. The rotation around the fourth rotating axis O4 is performed by driving of the fourth driving source 404. The fourth driving source 404 is driven by a motor 404M and a cable (not shown), and the motor 404M is controlled by the robot control device 20 through a motor driver 304 electrically connected to the motor 404M (see FIG. 4). Although the fourth driving source 404 may be configured to transmit a driving force from the motor 404M by a speed reducer (not shown) provided along with the motor 404M or a speed reducer may be omitted, in this embodiment, the fourth driving source 404 has a speed reducer. The fourth rotating axis O4 may be parallel to an axis orthogonal to the third rotating axis O3.

The fourth arm 15 and the wrist 16 are connected together through a joint 175. The wrist 16 has a fifth rotating axis O5 parallel to the horizontal direction as a rotation center with respect to the fourth arm 15, and is rotatable around the fifth rotating axis O5. The fifth rotating axis O5 is orthogonal to the fourth rotating axis O4. The rotation around the fifth rotating axis O5 is performed by driving of the fifth driving source 405. The fifth driving source 405 is driven by a motor 405M and a cable (not shown), and the motor 405M is controlled by the robot control device 20 through a motor driver 305 electrically connected to the motor 405M (see FIG. 4). Although the fifth driving source 405 may be configured to transmit a driving force from the motor 405M by a speed reducer (not shown) provided along with the motor 405M or a speed reducer may be omitted, in this embodiment, the fifth driving source 405 has a speed reducer. The wrist 16 has a sixth rotating axis O6 perpendicular to the fifth rotating axis O5 as a rotation center through a joint 176, and is rotatable around the sixth rotating axis O6. The sixth rotating axis O6 is orthogonal to the fifth rotating axis O5. The rotation around the sixth rotating axis O6 is performed by driving of the sixth driving source 406. The sixth driving source 406 is driven by a motor 406M and a cable (not shown), and the motor 406M is controlled by the robot control device 20 through a motor driver 306 electrically connected to the motor 406M (see FIG. 4). Although the sixth driving source 406 may be configured to transmit a driving force from the motor 406M by a speed reducer (not shown) provided along with the motor 406M or a speed reducer may be omitted, in this embodiment, the sixth driving source 406 has a speed reducer. The fifth rotating axis O5 may be parallel to an axis orthogonal to the fourth rotating axis O4, and the sixth rotating axis O6 may be parallel to an axis orthogonal to the fifth rotating axis O5.

As shown in FIG. 6, the first arm 12 is provided with a first angular velocity sensor 31, that is, a first angular velocity sensor unit 71 having the first angular velocity sensor 31 is provided. The angular velocity around the first rotating axis O1 of the first arm 12 is detected by the first angular velocity sensor 31.

As shown in FIG. 7, the third arm 14 is provided with a second angular velocity sensor 32, that is, a second angular velocity sensor unit 72 having the second angular velocity sensor 32. The angular velocity (the angular velocity of the third arm 14 including the rotation amount of the second arm 13, and the same applies to the below) around the second rotating axis O2 of the third arm 14 is detected by the second angular velocity sensor 32.

The first angular velocity sensor 31 and the second angular velocity sensor 32 are not particularly limited, and for example, a gyro sensor or the like may be used.

In the robot 1, vibration of the first arm 12, the second arm 13, and the third arm 14 is suppressed, thereby suppressing vibration of the entire robot 1. However, in order to suppress vibration of the first arm 12, the second arm 13, and the third arm 14, instead of providing the angular velocity sensor in each of the first arm 12, the second arm 13, and the third arm 14, as described above, the first angular velocity sensor 31 and the second angular velocity sensor 32 are respectively provided only in the first arm 12 and the third arm 14, and the actuation of the driving sources 401 and 402 is controlled on the basis of the detection results of the first angular velocity sensor 31 and the second angular velocity sensor 32. Accordingly, it is possible to reduce the number of angular velocity sensors, to reduce cost, and to simplify the circuit configuration compared to a case where the angular velocity sensor is provided in each of the first arm 12, the second arm 13, and the third arm 14. Since the angular velocity of the third arm 14 including the rotation amount of the second arm 13, instead of the angular velocity of the second arm 13 is detected by the second angular velocity sensor 32 it is possible to suppress vibration more reliably. The actuation of the second driving source 402 which rotates the second arm 13 on the base end side from the third arm 14 is controlled, whereby it is possible to increase the effect of suppressing vibration of the robot 1.

In the driving sources 401 to 406, a first position sensor 411, a second position sensor 412, a third position sensor 413, a fourth position sensor 414, a fifth position sensor 415, and a sixth position sensor 416 are respectively provided in the motors or the speed reducers. These position sensors are not particularly limited, and for example, an encoder, a rotary encoder, a resolver, a potentiometer, or the like may be used. The rotation angles of the shaft portions of the motors or the speed reducers of the driving sources 401 to 406 are detected by the position sensors 411 to 416. The motors of the driving sources 401 to 406 are not particularly limited, and for example, a servomotor, such as an AC servomotor or a DC servomotor, is preferably used. The respective cables may be inserted into the robot 1.

As shown in FIG. 4, the robot 1 is electrically connected to the robot control device 20. That is, the driving sources 401 to 406, the position sensors 411 to 416, and the angular velocity sensors 31 and 32 are electrically connected to the robot control device 20.

The robot control device 20 can actuate the arms 12 to 15 and the wrist 16 separately, that is, can control the driving sources 401 to 406 through the motor drivers 301 to 306 separately. In this case, the robot control device 20 performs detection by the position sensors 411 to 416, the first angular velocity sensor 31, and the second angular velocity sensor 32, and controls the driving of the driving sources 401 to 406, for example, the angular velocity, the rotation angle, or the like on the basis of the detection results. A control program is stored in a recording medium embedded in the robot control device 20 in advance.

As shown in FIGS. 1 and 2, if the robot 1 is a vertical articulated robot, the base 11 is a portion which is located on the lowermost side of the vertical articulated robot and is fixed to the floor 101 of the installation space. A fixing method is not particularly limited, and for example, in this embodiment shown in FIGS. 1 and 2, a fixing method by a plurality of bolts 111 is used. A fixing location of the base 11 in the installation space may be a wall or a ceiling of the installation space, instead of the floor.

The base 11 has a hollow base body (housing) 112. The base body 112 can be divided into a cylindrical portion 113 having a cylindrical shape, and a boxlike portion 114 having a boxlike shape which is formed integrally in the outer circumferential portion of the cylindrical portion 113. In the base body 112, for example, the motor 401M or the motor drivers 301 to 306 are stored.

Each of the arms 12 to 15 has a hollow arm body (housing) 2, a driving mechanism 3, and a sealing unit 4. Hereinafter, for convenience of description, the arm body 2, the driving mechanism 3, and the sealing unit 4 of the first arm 12 are respectively referred to as "arm body 2a", "driving mechanism 3a", and "sealing unit 4a", the arm body 2, the driving mechanism 3, and the sealing unit 4 of the second arm 13 are respectively referred to as "arm body 2b", "driving mechanism 3b", and "sealing unit 4b", the arm body 2, the driving mechanism 3, and the sealing unit 4 of the third arm 14 are respectively referred to as "arm body 2c", "driving mechanism 3c", and "sealing unit 4c", and the arm body 2, the driving mechanism 3, and the sealing unit 4 of the fourth arm 15 are respectively referred to as "arm body 2d", "driving mechanism 3d", and "sealing unit 4d".

Each of the joints 171 to 176 has a rotation support mechanism (not shown). The rotation support mechanism is a mechanism which rotatably supports one of two arms connected together with respect to the other arm, a mechanism which rotatably supports one of the base 11 and the first arm 12 connected together with respect to the other, or a mechanism which rotatably supports one of the fourth arm 15 and the wrist 16 connected together with respect to the other. In an example of the fourth arm 15 and the wrist 16 connected together, the rotation support mechanism can rotate the wrist 16 with respect to the fourth arm 15. Each rotation support mechanism has a speed reducer (not shown) which reduces the rotation speed of the corresponding motor at a predetermined reduction ratio, and transmits the driving force to the corresponding arm, a wrist body 161 of the wrist 16, and a support ring 162. As described above, in this embodiment, the speed reducer and the motor are referred to as a driving source.

The first arm 12 is connected to the upper end portion (front end portion) of the base 11 in a posture inclined with respect to the horizontal direction. In the first arm 12, the driving mechanism 3a has the motor 402M and is stored in the arm body 2a. The arm body 2a is sealed airtight by the sealing unit 4a. The arm body 2a has a pair of tongue piece portions 241a and 241b on the front end side, and a root portion 251 on the base end side. The tongue piece portion 241a and the tongue piece portion 241b are separated from each other and opposite to each other. The tongue piece portions 241a and 241b are inclined with respect to the root portion 251, and thus, the first arm 12 is inclined with respect to the horizontal direction. A base end portion of the second arm 13 is arranged between the tongue piece portion 241a and the tongue piece portion 241b.

The installation position of the first angular velocity sensor 31 in the first arm 12 is not particularly limited, and in this embodiment, as shown in FIG. 6, the first angular velocity sensor 31, that is, the first angular velocity sensor unit 71 is provided in an end portion of the root portion 251 of the arm body 2a of the first arm 12 on an opposite side to an internal cable 85. The cable 85 is a cable which supplies power to the motors 401M to 406M of the robot 1. Accordingly, it is possible to prevent the first angular velocity sensor 31 from being affected by noise from the cable 85, and to prevent a below-described circuit unit 713, a wiring, and the first angular velocity sensor 31 of the first angular velocity sensor unit 71 from being short-circuited by the cable 85.

Here, for the driving mechanism 3 and the speed reducer, representatively, the driving mechanism 3 which is provided in the arm body 2a of the first arm 12 and rotates the second arm 13 will be described.

As shown in FIG. 5, the driving mechanism 3 has a first pulley 91 which is connected to the shaft portion of the motor 402M, a second pulley 92 which is arranged to be separated from the first pulley 91, and a belt (timing belt) 93 which is stretched between the first pulley 91 and the second pulley 92. The second pulley 92 and the shaft portion of the second arm 13 are connected together by the speed reducer 45.

The speed reducer 45 is not particularly limited, and for example, a so-called "planetary gear-type" speed reducer having a plurality of gears, a harmonic drive ("Harmonic Drive" is Registered Trademark), or the like may be used.

A main cause for vibration of the arms 12 to 15 and the wrist 16 of the robot 1 is, for example, distortion or deflection of the speed reducer 45, expansion and contraction of the belt 93, deflection of the arms 12 to 15 and the wrist 16, or the like.

The second arm 13 is connected to a front end portion of the first arm 12. In the second arm 13, the driving mechanism 3b has the motor 403M and is stored in the arm body 2b. The arm body 2a is sealed airtight by the sealing unit 4b. The arm body 2b has a pair of tongue piece portions 242a and 242b on the front end side, and a root portion 252 on the base end side. The tongue piece portion 242a and the tongue piece portion 242b are separated from each other and opposite to each other. A base end portion of the third arm 14 is arranged between the tongue piece portion 242a and the tongue piece portion 242b.

The third arm 14 is connected to a front end portion of the second arm 13. In the third arm 14, the driving mechanism 3c has the motor 404M and is stored in the arm body 2c. The arm body 2c is sealed airtight by the sealing unit 4c. The arm body 2c is constituted by a member corresponding to the root portion 251 of the arm body 2a and the root portion 252 of the arm body 2b.

The installation position of the second angular velocity sensor 32 in the third arm 14 is not particularly limited, and in this embodiment, as shown in FIG. 7, the second angular velocity sensor 32 that is, the second angular velocity sensor unit 72 is provided in an end portion of the arm body 2c of the third arm 14 on an opposite side to the internal cable 85. Accordingly, it is possible to prevent the second angular velocity sensor 32 from being affected by noise from the cable 85, and to prevent a circuit unit 723, a wiring, and the second angular velocity sensor 32 of the second angular velocity sensor unit 72 from being short-circuited by the cable 85.

The fourth arm 15 is connected to a front end portion of the third arm 14 in parallel with the center axis direction. In the fourth arm 15, the driving mechanism 3d has the motors 405M and 406M and is stored in the arm body 2d. The arm body 2d is sealed airtight by the sealing unit 4d. The arm body 2d has a pair of tongue piece portions 244a and 244b on the front end side, and a root portion 254 on the base end side. The tongue piece portion 244a and the tongue piece portion 244b are separated from each other and opposite to each other. The support ring 162 of the wrist 16 is arranged between the tongue piece portion 244a and the tongue piece portion 244b.

The wrist 16 is connected to a front end portion (an end portion on an opposite side to the base 11) of the fourth arm 15. In the wrist 16, for example, a manipulator (not shown) which holds precision equipment, such as a wristwatch, is detachably mounted as a functional unit (end effector) in the front end portion (the end portion on an opposite side to the fourth arm 15). The manipulator is not particularly limited, and for example, a configuration in which a plurality of finger portions are provided may be used. The robot 1 controls the operations of the arms 12 to 15, the wrist 16, and the like while holding the precision equipment with the manipulator, thereby conveying the precision equipment.

The wrist 16 has a cylindrical wrist body (sixth arm) 161, and the ring-shaped support ring (fifth arm) 162 which is constituted separately from the wrist body 161 and is provided in the base end portion of the wrist body 161.

A front end surface 163 of the wrist body 161 is a flat surface, and becomes a mounting surface on which the manipulator is mounted. The wrist body 161 is connected to the driving mechanism 3d of the fourth arm 15 through the joint 176, and rotates around the sixth rotating axis O6 by driving of the motor 406M of the driving mechanism 3d.

The support ring 162 is connected to the driving mechanism 3d of the fourth arm 15 through the joint 175, and rotates around the fifth rotating axis O5 along with the wrist body 161 by driving of the motor 405M of the driving mechanism 3d.

A constituent material of the arm body 2 is not particularly limited, and for example, various metal materials may be used and of these, aluminum or an aluminum alloy is particularly preferably used. If the arm body 2 is a casting which is molded using a mold, aluminum or an aluminum alloy is used as the constituent material of the arm body 2, whereby it is possible to easily perform metallic molding.

A constituent material of each of the base body 112 of the base 11, the wrist body 161 of the wrist 16, and the support ring 162 is not particularly limited, and for example, the same material as the constituent material of the arm body 2 may be used. As a constituent material of the wrist body 161 of the wrist 16, stainless steel is preferably used.

A constituent material of the sealing unit 4 is not particularly limited, and for example, various resin materials and various metal materials may be used. A resin material is used as the constituent material of the sealing unit 4, whereby it is possible to achieve reduction in weight.

Next, the first angular velocity sensor unit 71 and the second angular velocity sensor unit 72 will be described.

As shown in FIG. 8, the first angular velocity sensor unit 71 has a first housing 711, and a circuit board 712 having a wiring and the first angular velocity sensor 31 and a circuit unit 713 electrically connected onto the circuit board 712, which are provided in the first housing 711. In this embodiment, the first housing 711 is made of a sealing material, and the first angular velocity sensor 31, the circuit unit 713, and the circuit board 712 are collectively sealed by the sealing material.

Similarly, the second angular velocity sensor unit 72 has a second housing 721, and a circuit board 722 having a wiring and the second angular velocity sensor 32 and a circuit unit 723 electrically connected onto the circuit board 722, which are provided in the second housing 721. In this embodiment, the second housing 721 is made of a seal ing material, and the second angular velocity sensor 32, the circuit unit 723, and the circuit board 722 are collectively sealed by the sealing material.

In this way, the first angular velocity sensor 31, the circuit unit 713, the second angular velocity sensor 32, and the circuit unit 723 are packaged, thereby simplifying the configuration. Since the first angular velocity sensor unit 71 and the second angular velocity sensor unit 72 have the same configuration, hereinafter, the first angular velocity sensor unit 71 will be representatively described, and description of the second angular velocity sensor unit 72 will be omitted.

The first angular velocity sensor 31 has a gyro element 33 which includes one detection axis. The configuration of the gyro element 33 is not particularly limited, and for example, the following gyro element may be used. Hereinafter, as shown in FIGS. 9, 10A, and 10B, the axes orthogonal to each other are defined as an X axis, a Y axis, and a Z axis.

As shown in FIG. 9, the gyro element 33 has a quartz substrate having a base portion 331, a pair of detection vibrating arms 332a and 332b which extend from both sides of the base portion 331 in the Y-axis direction and in opposite directions, a pair of connecting arms 333a and 333b which extend from both sides of the base portion 331 in the X-axis direction and in opposite directions, a pair of driving vibrating arms 334a and 334b which extend from both sides of a front end portion of the connecting arm 333a in the Y-axis direction and in opposite directions, and a pair of driving vibrating arms 334c and 334d which extend from both sides of a front end portion of the connecting arm 333b in the Y-axis direction and in opposite directions, detection electrodes (not shown) which are provided in the respective detection vibrating arms 332a and 332b, and driving electrodes (not shown) which are provided in the respective driving vibrating arms 334a, 334b, 334c, and 334d.

The gyro element 33 is actuated as follows. In FIGS. 10A and 10B, the respective vibrating arms are represented by lines so as to easily express a vibration form.

First, as shown in FIG. 10A, in a state where the angular velocity is not applied to the gyro element 33, a voltage is applied to the driving electrodes to cause bending vibration of the respective driving vibrating arms 334a, 334b, 334c, and 334d in a direction indicated by arrow E. In the bending vibration, a vibration mode indicated by a solid line and a vibration mode indicated by a two-dot-chain line are repeated at a predetermined frequency. At this time, the driving vibrating arms 334a and 334b and the driving vibrating arms 334c and 334d vibrate line-symmetrically with respect to the Y axis passing through the center of gravity G.

As shown in FIG. 10B, in a state where the vibration is performed, if an angular velocity ω around the Z axis (detection axis) is applied to the gyro element 33, a Coriolis force in a direction of arrow B acts on the driving vibrating arms 334a, 334b, 334c, and 334d and the connecting arms 333a and 333b, and renewed vibration is excited in these arms. Simultaneously, vibration in a direction of arrow C in response to vibration indicated by arrow B is excited in the detection vibrating arms 332a and 332b. A signal (voltage) according to strain of the detection vibrating arms 332a and 332b caused by vibration of the detection vibrating arms 332a and 332b is output from the detection electrodes.

In the above, the gyro element 33 has been simply described.

The circuit unit 713 has an AD conversion unit which performs AD conversion on the signal output from the first angular velocity sensor 31, that is, converts an analog signal to a digital signal, and a transmitting unit which transmits the converted signal to the robot control device 20.

The appearance of the first housing 711 is a cube. The detection axis of the first angular velocity sensor 31 matches (is aligned with) the normal to the largest surface of the rectangular parallelepiped of the first housing 711. With this, it is possible to recognize the directions of the detection axis of the first angular velocity sensor 31 and the detection axis of the second angular velocity sensor 32 easily and reliably, and to allow the first angular velocity sensor 31 and the second angular velocity sensor 32 to take an appropriate posture easily. In particular, as described above, since the gyro element 33 has a flat shape, and the normal to the plate surface is defined as the detection axis, it becomes easy to allow the detection axis of the first angular velocity sensor 31 to match (to be aligned with) the normal to the largest surface of the rectangular parallelepiped of the first housing 711.

The first angular velocity sensor unit 71 is provided such that a detection axis 31a of the first angular velocity sensor 31 is inclined with respect to the first rotating axis O1 at a predetermined angle (first angle) θ1. It should suffice that the angle θ1 is equal to or greater than 0° and smaller than 90° (0°≤θ1<90°). If θ1=0°, the detection axis 31a of the first angular velocity sensor 31 matches (is parallel to) the first rotating axis O1. For this reason, the angular velocity detected by the first angular velocity sensor 31 substantially matches the angular velocity around the first rotating axis O1 of the first arm 12. Accordingly, it is possible to detect the angular velocity around the first rotating axis O1 accurately without substantially correcting the angular velocity detected by the first angular velocity sensor 31.

If 0°<θ1<90°, the detection axis 31a of the first angular velocity sensor 31 is inclined with respect to the first rotating axis O1. For this reason, the angular velocity detected by the first angular velocity sensor 31 is deviated from the angular velocity around the first rotating axis O1 of the first arm 12. However, if the angle θ1 is set to a predetermined angle in advance, it is possible to detect the angular velocity around the first rotating axis O1 of the first arm 12 accurately by correcting the angular velocity detected by the first angular velocity sensor 31 on the basis of the angle θ1. The correction at this time is a simple computation, and complicated and enormous computation is not required. For this reason, a computation error is less likely to occur, and it is possible to reliably suppress vibration and to increase a response speed in the control of the robot 1.

For example, as shown in FIG. 11A, a first axis J1 parallel to (or matching) the first rotating axis O1, a second axis (a axis) J2 orthogonal to the first axis J1, and a third axis (b axis) J3 orthogonal to both the first axis J1 and the second axis J2 are set, and when the angle around the second axis J2 of the detection axis 31a is α1, and the angle around the third axis J3 of the detection axis 31a is β1, and the angular velocity which is detected by the first angular velocity sensor 31 is ω1, ω1 cos α1 cos β1 is set as the angular velocity around the first rotating axis O1 of the first arm 12. In order to secure high correction precision, it is preferable that θ1 is as small as possible, and specifically, satisfies the range of 0°<θ1≤15°. When this range is satisfied, it is possible to detect the angular velocity around the first rotating axis O1 of the first arm 12 with higher precision. However, the correction method is not limited to the above-described method.

In recent years, with the advancement of reduction in size and weight of the robot 1, there is a case where the first angular velocity sensor 31 cannot be arranged at θ1=0° depending on the internal space of the first arm 12. In this case, the first angular velocity sensor 31 is arranged in the first arm 12 such that θ1 becomes a desired angle, whereby it is possible to detect the angular velocity around the first rotating axis O1 of the first arm 12 with high precision.

The second angular velocity sensor unit 72 is provided such that a detection axis 32a of the second angular velocity sensor 32 is inclined with respect to the second rotating axis O2 at a predetermined angle (second angle) θ2. It should suffice that the angle θ2 is equal to or greater than 0° and smaller than 90° (0°≤θ2<90°). If θ2=0°, the detection axis 32a of the second angular velocity sensor 32 matches (is parallel to) the second rotating axis O2. For this reason, the angular velocity detected by the second angular velocity sensor 32 substantially matches the angular velocity around the second rotating axis O2 of the third arm 14. Accordingly, it is possible to detect the angular velocity around the second rotating axis O2 of the third arm 14 accurately without substantially correcting the angular velocity detected by the second angular velocity sensor 32.

If 0°<θ2<90°, the detection axis 32a of the second angular velocity sensor 32 is inclined with respect to the second rotating axis O2. For this reason, the angular velocity detected by the second angular velocity sensor 32 is deviated from the angular velocity around the second rotating axis O2 of the third arm 14. However, if the angle θ2 is set to a predetermined angle in advance, it is possible to detect the angular velocity around the second rotating axis O2 of the third arm 14 accurately by correcting the angular velocity detected by the second angular velocity sensor 32 on the basis of the angle θ2. The correction at this time is a simple computation, and complicated and enormous computation is not required. For this reason, a computation error is less likely to occur, and it is possible to reliably suppress vibration and to increase a response speed in the control of the robot 1.

For example, as shown in FIG. 11B, a first axis J1' parallel to (or matching) the second rotating axis O2, a second axis (c axis) J2' orthogonal to the first axis J1', and a third axis (d axis) J3' orthogonal to both the first axis J1' and the second axis J2' are set, and when the angle around the second axis J2' of the detection axis 32a is α2, the angle around the third axis J3' of the detection axis 32a is β2, and the angular velocity which is detected by the second angular velocity sensor 32 is ω2, ω2 cos α2 cos β2 is set as the angular velocity around the second rotating axis O2 of the third arm 14. In order to secure high correction precision, it is preferable that θ2 is as small as possible, and specifically, satisfies the range of 0°<θ2≤15°. When this range is satisfied, it is possible to detect the angular velocity around the second rotating axis O2 of the third arm 14 with higher precision. However, the correction method is not limited to the above-described method.

In recent years, with the advancement of reduction in size and weight of the robot 1, there is a case where the second angular velocity sensor 32 cannot be arranged at θ2=0° depending on the internal space of the third arm 14. In this case, the second angular velocity sensor 32 is arranged in the third arm 14 such that θ2 becomes a desired angle, whereby it is possible to detect the angular velocity around the second rotating axis O2 of the third arm 14 with high precision.

As shown in FIG. 6 or 8, the first housing 711 has attachment portions 7111 to be attached to the first arm 12 in four corner portions. In each attachment portion 7111, a hole 7112 into which a screw (fixing member) 81 is inserted is formed.

The first arm 12 has three arm-side attachment portions 121 which are formed integrally with the arm body 2a and to which the first angular velocity sensor unit 71 (first housing 711) is attached. Each arm-side attachment portion 121 is constituted by a fulcrum which is formed to protrude toward the arm body 2a. The respective arm-side attachment portions 121 are arranged at positions corresponding to the attachment portions 7111 of the first housing 711. In the front end portion of each arm-side attachment portion 121, a threaded bore 122 into which the screw 81 is threaded is formed.

The term "integrally" in the arm-side attachment portions 121 formed integrally with the arm body 2a refers to a case where the arm body 2a and the arm-side attachment portions 121 are formed simultaneously by, for example, die-casting or the like, instead of forming members separately and bonding the members. The same applies to the term "integrally" in a below-described arm-side attachment portion 131 formed integrally with the arm body 2b.

When attaching (providing) the first angular velocity sensor unit 71 to the first arm 12, three screws 81 are inserted into the holes 7112 of the first housing 711 and threaded into the threaded bores 122 in the front end portions of the arm-side attachment portions 121 of the first arm 12. With this, the three attachment portions 7111 of the first housing 711 are fixed to the arm-side attachment portions 121 of the first arm 12 by the screws 81. That is, the first angular velocity sensor unit 71 is attached to the arm-side attachment portions 121 of the first arm 12. In this case, there is nothing between the arm-side attachment portions 121 and the first angular velocity sensor unit 71, that is, the first angular velocity sensor unit 71 is directly attached to the arm-side attachment portions 121. With this, it is possible to attach the first angular velocity sensor unit 71 to the first arm 12 reliably, and to allow the first angular velocity sensor unit 71 to rotate integrally with the first arm 12 reliably.

The term "directly" when the first angular velocity sensor unit 71 is directly attached to the arm-side attachment portions 121 refers to a case excluding a case where the first angular velocity sensor unit 71 is attached to an intermediate, such as a separate substrate, and the intermediate is attached to the arm-side attachment portions 121. That is, the term "directly" refers to a case where there is nothing, excluding an adhesive or the like, between the arm-side attachment portions 121 and the first angular velocity sensor unit 71. The same applies to the term "directly" when the below-described second angular velocity sensor unit 72 is directly attached to an arm-side attachment portion 131.

The screws 81 are conductive and are formed of, for example, various metal materials. If the screws 81 are inserted into the holes 7112 of the first housing 711 and are threaded into the threaded bores 122 in the front end portions of the arm-side attachment portions 121, the screws 81 are electrically connected to the wiring of the circuit board 712 electrically connected to a ground terminal of the circuit unit 713, and the front end portions of the screws 81 are electrically connected to the arm-side attachment portions 121. With this, the ground terminal of the circuit unit 713 is electrically connected to the arm body 2a of the first arm 12 through the wiring and the screws 81 and grounded. Accordingly, it is possible to reduce the number of components for grounding and to simplify the configuration.

As shown in FIGS. 7 and 8, the second housing 721 has attachment portions 7211 to be attached to the third arm 14 in four corner portions. In each attachment portion 7211, a hole 7212 into which the screw 81 is inserted is formed.

As shown in FIG. 7, the third arm 14 has an arm-side attachment portion 141 which is formed integrally with the arm body 2c and to which the second angular velocity sensor unit 72 (second housing 721) is attached. The arm-side attachment portion 141 has a shape corresponding to the second housing 721. That is, the arm-side attachment portion 141 has a plate shape, and the shape in plan view is a quadrangular shape, in this embodiment, a rectangular shape. In each corner portion of the arm-side attachment portion 141, a threaded bore into which the screw 81 is threaded is formed.

When attaching the second angular velocity sensor unit 72 to the third arm 14, the four screws 81 are inserted into the holes 7212 of the second housing 721 and threaded into the threaded bores in the front end portions of the arm-side attachment portion 141 of the third arm 14. With this, the four attachment portions 7211 of the second housing 721 are fixed to the arm-side attachment portion 141 of the third arm 14 by the screws 81. That is, the second angular velocity sensor unit 72 is attached to the arm-side attachment portion 141 of the third arm 14. In this case, there is nothing between the arm-side attachment portion 141 and the second angular velocity sensor unit 72, that is, the second angular velocity sensor unit 72 is directly attached to the arm-side attachment portions 141. Accordingly, it is possible to attach the second angular velocity sensor unit 72 to the third arm 14 reliably, and to allow the second angular velocity sensor unit 72 to rotate integrally with the third arm 14 reliably.

If the screws 81 are inserted into the holes 7212 of the second housing 721 and threaded into the threaded bores of the arm-side attachment portion 141, the screws 81 are electrically connected to a wiring of the circuit board 722 electrically connected to a ground terminal of the circuit unit 723, and the front end portions of the screws 81 are electrically connected to the arm-side attachment portion 141. With this, the ground terminal of the circuit unit 723 is electrically connected to the arm body 2c of the third arm 14 through the wiring and the screws 81 and grounded. Accordingly, it is possible to reduce the number of components for grounding and to simplify the configuration.

Next, the configuration of the robot control device 20 will be described referring to FIGS. 4 and 12 to 16.

The robot control device 20 has a receiving unit which receives a first signal output from the first angular velocity sensor 31, a second signal output from the second angular velocity sensor 32, and respective signals output from the position sensors 411 to 416, a calculation unit which obtains a vibrational component of the angular velocity of the first arm 12 and a vibrational component of the angular velocity of the third arm 14 on the basis of the first signal and the second signal received by the receiving unit, and a control unit which controls the actuation of the robot 1 on the basis of the vibrational component of the angular velocity of the first arm 12 and the vibrational component of the angular velocity of the third arm 14 obtained by the calculation unit.

Specifically, as shown in FIGS. 4 and 12 to 16, the robot control device 20 has the receiving unit, a first driving source control unit 201 which controls the actuation of the first driving source 401, a second driving source control unit 202 which controls the actuation of the second driving source 402, a third driving source control unit 203 which controls the actuation of the third driving source 403, a fourth driving source control unit 204 which controls the actuation of the fourth driving source 404, a fifth driving source control unit 205 which controls the actuation of the fifth driving source 405, and a sixth driving source control unit 206 which controls the actuation of the sixth driving source 406.

The calculation unit has a below-described angular velocity calculation unit 561 and a subtracter 571 of the first driving source control unit 201, a below-described angular velocity calculation unit 562 and an adder-subtracter 622 of the second driving source control unit 202, and a below-described angular velocity calculation unit 563 of the third driving source control unit 203.

Figure 12:
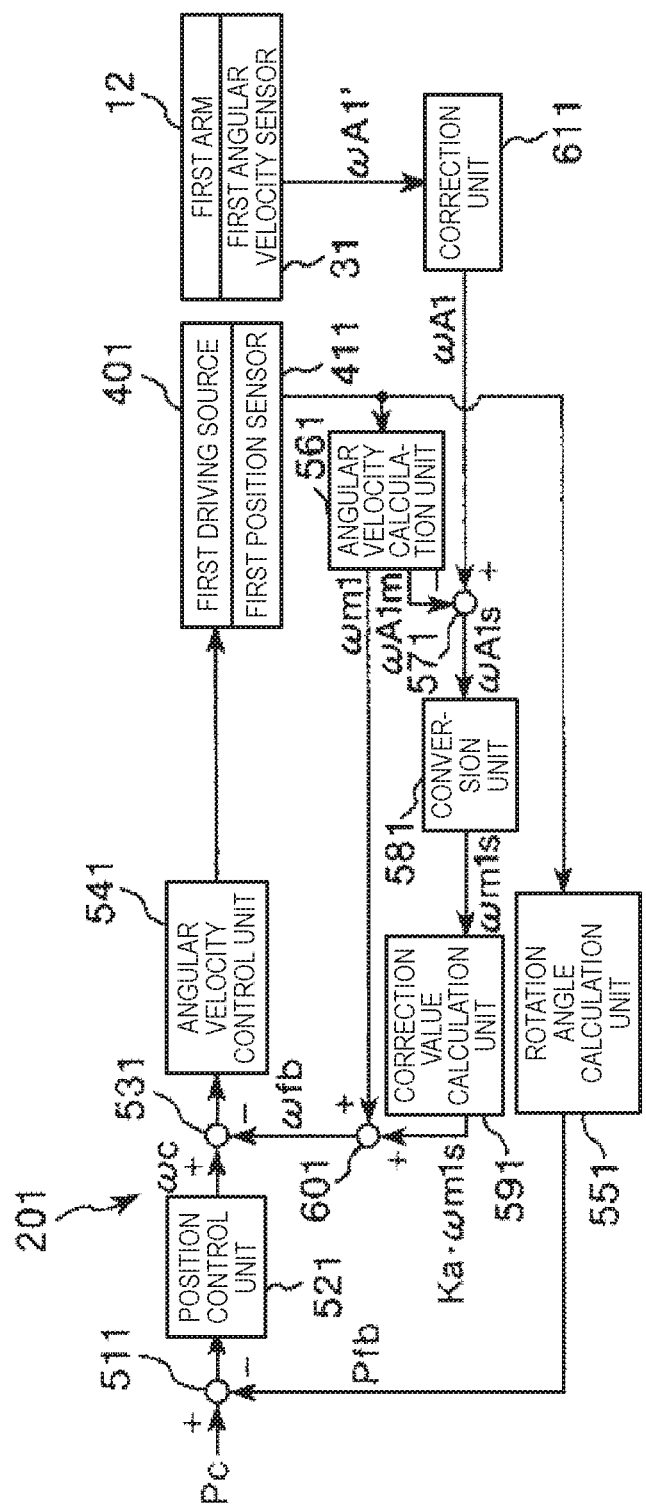
FIG. 12 is a block diagram of a part of the robot shown in FIG. 1.

As shown in FIG. 12, the first driving source control unit 201 has a subtracter 511, a position control unit 521, a subtracter 531, an angular velocity control unit 541, a rotation angle calculation unit 551, an angular velocity calculation unit 561, a subtracter 571, a conversion unit 581, a correction value calculation unit 591, and an adder 601.

Figure 13:
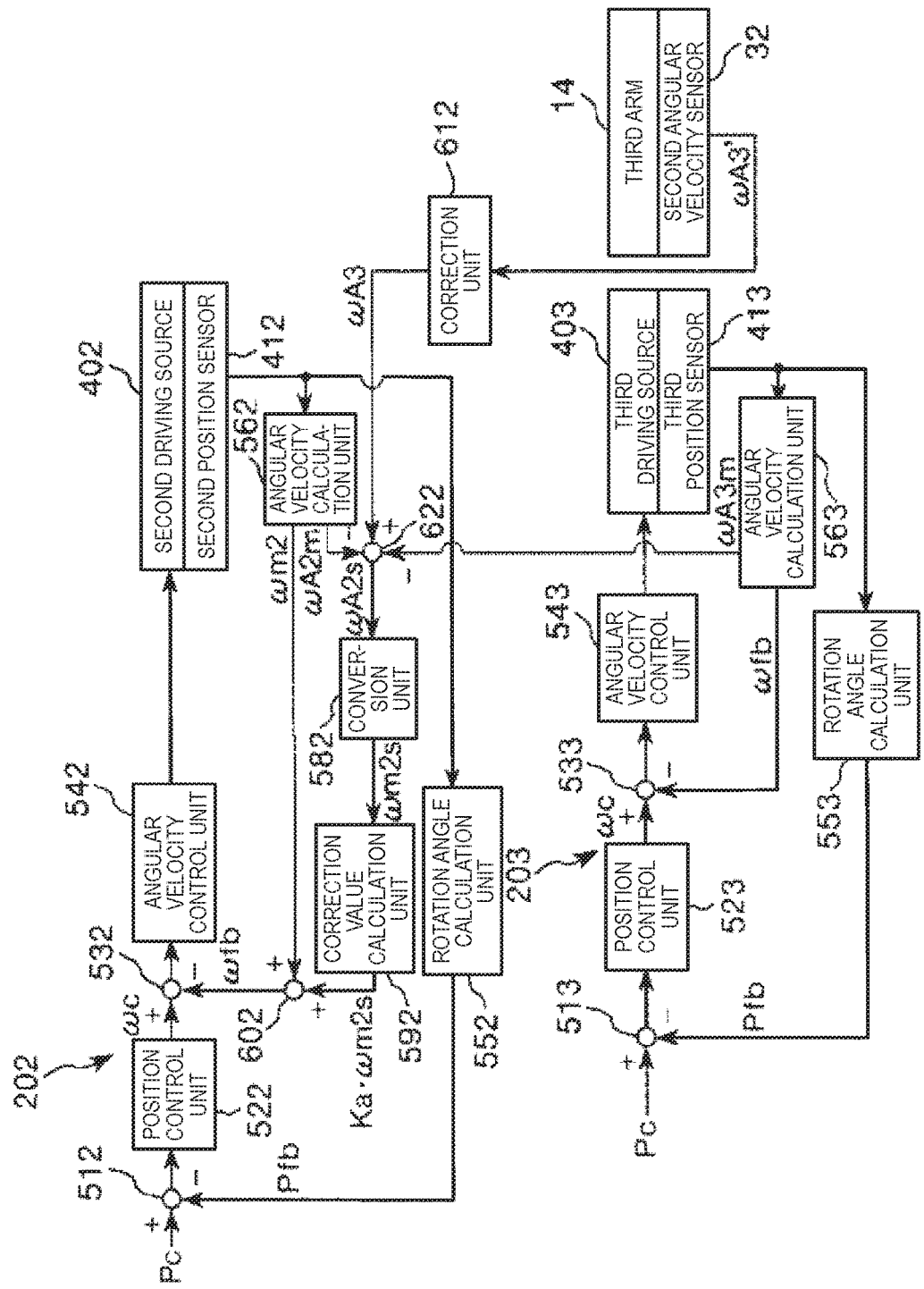
FIG. 13 is a block diagram of a part of the robot shown in FIG. 1.

As shown in FIG. 13, the second driving source control unit 202 has a subtracter 512, a position control unit 522, a subtracter 532, an angular velocity control unit 542, a rotation angle calculation unit 552, an angular velocity calculation unit 562, an adder-subtracter 622, a conversion unit 582, a correction value calculation unit 592, and an adder 602.

As shown in FIG. 13, the third driving source control unit 203 has a subtracter 513, a position control unit 523, a subtracter 533, an angular velocity control unit 543, a rotation angle calculation unit 553, and an angular velocity calculation unit 563.

Figure 14:
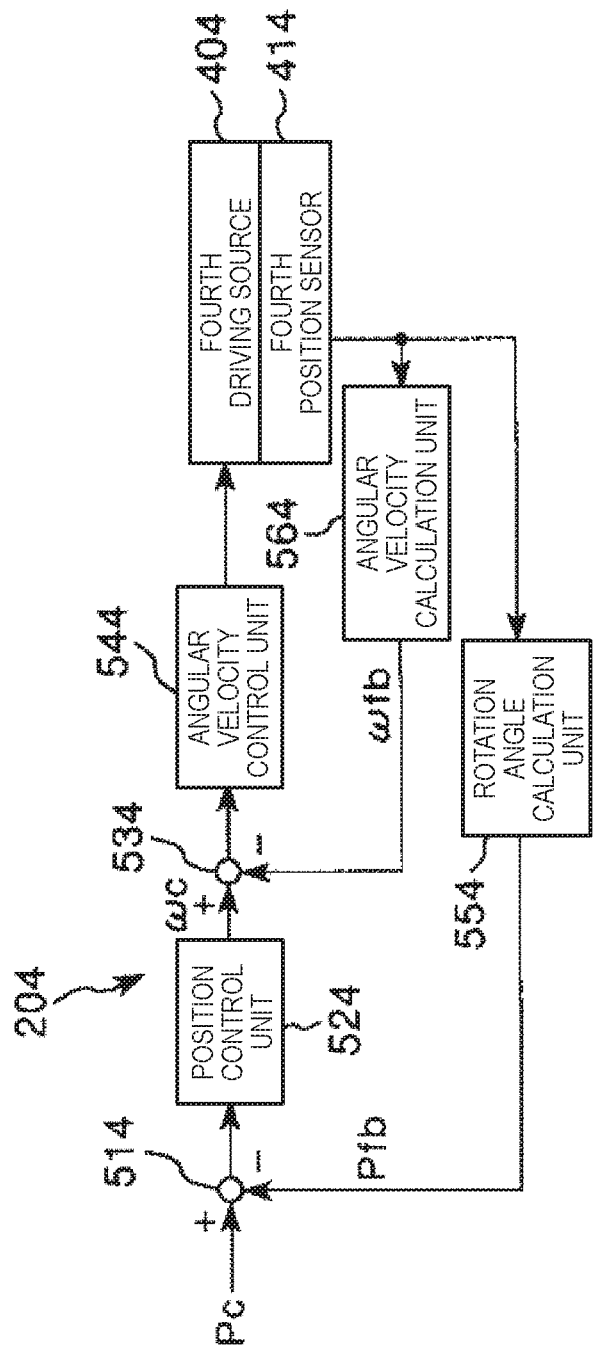
FIG. 14 is a block diagram of a part of the robot shown in FIG. 1.

As shown in FIG. 14, the fourth driving source control unit 204 has a subtracter 514, a position control unit 524, a subtracter 534, an angular velocity control unit 544, a rotation angle calculation unit 554, and an angular velocity calculation unit 564.

Figure 15:
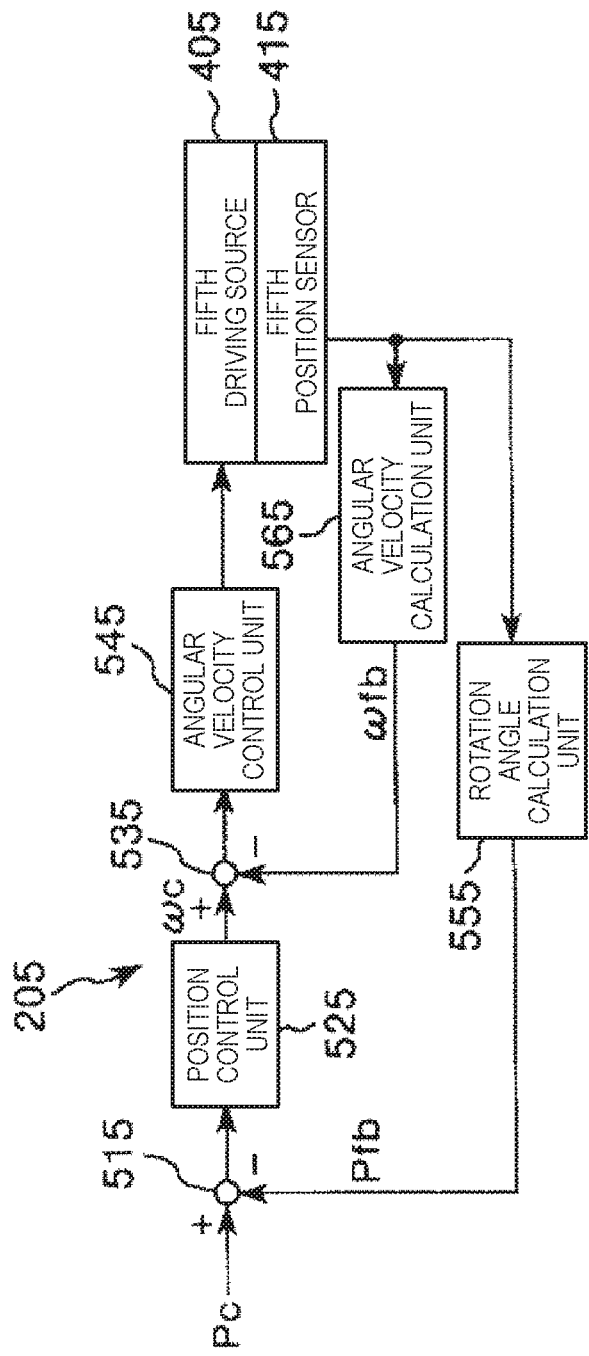
FIG. 15 is a block diagram of a part of the robot shown in FIG. 1.

As shown in FIG. 15, the fifth driving source control unit 205 has a subtracter 515, a position control unit 525, a subtracter 535, an angular velocity control unit 545, a rotation angle calculation unit 555, and an angular velocity calculation unit 565.

Figure 16:
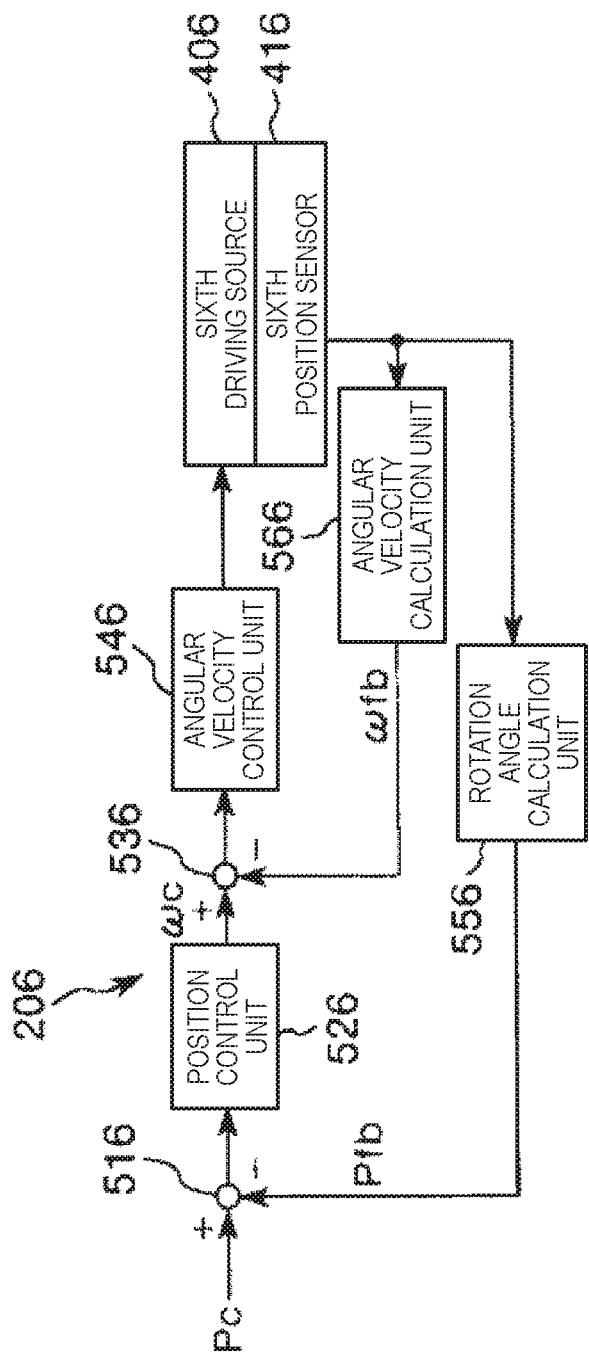
FIG. 16 is a block diagram of a part of the robot shown in FIG. 1.

As shown in FIG. 16, the sixth driving source control unit 206 has a subtracter 516, a position control unit 526, a subtracter 536, an angular velocity control unit 546, a rotation angle calculation unit 556, and an angular velocity calculation unit 566.

Here, the robot control device 20 calculates a target position of the wrist 16 on the basis of the content of processing performed by the robot 1, and produces a track for moving the wrist 16 to the target position. The robot control device 20 measures the rotation angle of each of the driving sources 401 to 406 at every predetermined control period such that the wrist 16 moves along the produced track, and outputs values calculated on the basis of the measurement results to the driving source control units 201 to 206 as a position command Pc of each of the driving sources 401 to 406 (see FIGS. 12 to 16). In the above and following description, the description "the values are input and output" or the like means that "signals corresponding to the values are input and output".

As shown in FIG. 12, in addition to the position command Pc of the first driving source 401, the detection signals from the first position sensor 411 and the first angular velocity sensor 31 (correction unit 611) are input to the first driving source control unit 201. The first driving source control unit 201 drives the first driving source 401 by feedback control using the respective detection signals such that the rotation angle (position feedback value Pfb) of the first driving source calculated from the detection signal of the first position sensor 411 becomes the position command Pc and a below-described angular velocity feedback value ωfb becomes a below-described angular velocity command ωc.

That is, the position command Pc and a below-described position feedback value Pfb from the rotation angle calculation unit 551 are input to the subtracter 511 of the first driving source control unit 201. In the rotation angle calculation unit 551, the number of pulses input from the first position sensor 411 is counted, and the rotation angle of the first driving source 401 according to the count value is output to the subtracter 511 as the position feedback value Pfb. The subtracter 511 outputs the deviation (the value obtained by subtracting the position feedback value Pfb from a target value of the rotation angle of the first driving source 401) between the position command Pc and the position feedback value Pfb to the position control unit 521.

The position control unit 521 performs predetermined calculation processing using the deviation input from the subtracter 511, and a proportional gain or the like as a preset coefficient, and calculates a target value of the angular velocity of the first driving source 401 according to the deviation. The position control unit 521 outputs a signal representing the target value (command value) of the angular velocity of the first driving source 401 to the subtracter 531 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 531. The subtracter 531 outputs the deviation (the value obtained by subtracting the angular velocity feedback value ωfb from the target value of the angular velocity of the first driving source 401) between the angular velocity command ωc and the angular velocity feedback value ωfb to the angular velocity control unit 541.

The angular velocity control unit 541 performs predetermined calculation processing including integration using the deviation input from the subtracter 531, and a proportional gain, an integral gain, and the like as preset coefficients, produces a driving signal (driving current) of the first driving source 401 according to the deviation, and supplies the driving signal to the motor 401M through the motor driver 301. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the first driving source 401 is controlled.

Next, the angular velocity feedback value ωfb in the first driving source control unit 201 will be described.

In the angular velocity calculation unit 561, an angular velocity ωm1 of the first driving source 401 is calculated on the basis of the frequency of a pulse signal input from the first position sensor 411, and the angular velocity ωm1 is output to the adder 601.

In the angular velocity calculation unit 561, an angular velocity ωA1 m around the first rotating axis O1 of the first arm 12 is calculated on the basis of the frequency of the pulse signal input from the first position sensor 411, and the angular velocity ωA1 m is output to the subtracter 571. The angular velocity ωA1 m is a value obtained by dividing the angular velocity ωm1 by a reduction ratio between the motor 401M of the first driving source 401 and the first arm 12, that is, in the joint 171.

An angular velocity ωA1' corresponding to the rotation around the first rotating axis O1 of the first arm 12 is detected by the first angular velocity sensor 31, and the detected angular velocity ωA1' is output to a correction unit 611. For example, the correction unit 611 multiplies the angular velocity ωA1' input from the first angular velocity sensor 31 by cos α1 cos β1. ωA1 ' cos α1 cos β1 is output to the subtracter 571 as an angular velocity ωA1 around the first rotating axis O1 of the first arm 12. However, if θ1=0°, since ωA1'=ωA1, correction by the correction unit 611 is not required, and the correction unit 611 may be omitted.

The angular velocity ωA1 and the angular velocity ωA1m are input to the subtracter 571, and the subtracter 571 outputs a value ωA1 s (=ωA1−ωA1 m) obtained by subtracting the angular velocity ωA1m from the angular velocity ωA1 to the conversion unit 581. The value ωA1 s corresponds to a vibrational component (vibrational angular velocity) of the angular velocity around the first rotating axis O1 of the first arm 12. Hereinafter, ωA1 s is referred to as a vibrational angular velocity. In this embodiment, feedback control is performed to return a below-described gain Ka multiple of the vibrational angular velocity ωA1 s (in detail, an angular velocity ωm1 s in the motor 401M which is a value produced on the basis of the vibrational angular velocity ωA1 s) to the input side of the first driving source 401. Specifically, the feedback control is performed on the first driving source 401 such that the vibrational angular velocity ωA1 s becomes 0 as much as possible. Accordingly, it is possible to suppress vibration of the robot 1. In the feedback control, the angular velocity of the first driving source 401 is controlled.

The conversion unit 581 converts the vibrational angular velocity ωA1 s to the angular velocity ωm1 s in the first driving source 401, and outputs the angular velocity ωm1 s to the correction value calculation unit 591. The conversion can be performed by multiplying the vibrational angular velocity ωA1 s by a reduction ratio between the motor 401M of the first driving source 401 and the first arm 12, that is, in the joint 171.

The correction value calculation unit 591 multiplies the angular velocity ωm1 s by the gain (feedback gain) Ka as a preset coefficient, obtains a correction value Ka·ωm1 s, and outputs the correction value Ka·ωm1 s to the adder 601.

The angular velocity ωm1 and the correction value Ka·ωm1s are input to the adder 601. The adder 601 outputs the sum of the angular velocity ωm1 and the correction value Ka·ωm1s to the subtracter 531 as the angular velocity feedback value ωfb. A subsequent operation is as described above.

As shown in FIG. 13, in addition to the position command Pc of the second driving source 402, the detection signals from the second position sensor 412 and the second angular velocity sensor 32 (correction unit 612) are input to the second driving source control unit 202. The angular velocity ωA3m around the third rotating axis O3 of the third arm 14 from the third driving source control unit 203 is input to the second driving source control unit 202. The second driving source control unit 202 drives the second driving source 402 by feedback control using the respective detection signals such that the rotation angle (position feedback value Pfb) of the second driving source calculated from the detection signal of the second position sensor 412 becomes the position command Pc and a below-described angular velocity feedback value ωfb becomes a below-described angular velocity command ωc.

That is, the position command Pc and a below-described position feedback value Pfb from the rotation angle calculation unit 552 are input to the subtracter 512 of the second driving source control unit 202. In the rotation angle calculation unit 552, the number of pulses input from the second position sensor 412 is counted, and the rotation angle of the second driving source 402 according to the count value is output to the subtracter 512 as the position feedback value Pfb. The subtracter 512 outputs the deviation (the value obtained by subtracting the position feedback value Pfb from a target value of the rotation angle of the second driving source 402) between the position command Pc and the position feedback value Pfb to the position control unit 522.

The position control unit 522 performs predetermined calculation processing using the deviation input from the subtracter 512, and a proportional gain or the like as a preset coefficient, and calculates the target value of the angular velocity of the second driving source 402 according to the deviation. The position control unit 522 outputs a signal representing the target value (command value) of the angular velocity of the second driving source 402 to the subtracter 532 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 532. The subtracter 532 outputs the deviation (the value obtained by subtracting the angular velocity feedback value ωfb from the target value of the angular velocity of the second driving source 402) between the angular velocity command ωc and the angular velocity feedback value ωfb to the angular velocity control unit 542.

The angular velocity control unit 542 performs predetermined calculation processing including integration using the deviation input from the subtracter 532, and a proportional gain, an integral gain, and the like as preset coefficients, produces a driving signal (driving current) of the second driving source 402 according to the deviation, and supplies the driving signal to the motor 402M through the motor driver 302. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the second driving source 402 is controlled. Since the second rotating axis O2 is orthogonal to the first rotating axis O1, it is possible to control the actuation of the second driving source 402 separately from the first driving source 401 without being affected by operation or vibration of the first arm 12.

Next, the angular velocity feedback value ωfb in the second driving source control unit 202 will be described.

In the angular velocity calculation unit 562, an angular velocity ωm2 of the second driving source 402 is calculated on the basis of the frequency of a pulse signal input from the second position sensor 412, and the angular velocity ωm2 is output to the adder 602.

In the angular velocity calculation unit 562, an angular velocity ωA2 m around the second rotating axis O2 of the second arm 13 is calculated on the basis of the frequency of the pulse signal input from the second position sensor 412, and the angular velocity ωA2 m is output to the adder-subtracter 622. The angular velocity ωA2 m is a value obtained by dividing the angular velocity ωm2 by a reduction ratio between the motor 402M of the second driving source 402 and the second arm 13, that is, in the joint 172.

In the angular velocity calculation unit 563 of the third driving source control unit 203, the angular velocity ωA3 m around the third rotating axis O3 of the third arm 14 is calculated on the basis of the frequency of a pulse signal input from the third position sensor 413, and the angular velocity ωA3 m is output to the adder-subtracter 622. The angular velocity ωA3 m is a value obtained by dividing the angular velocity ωm3 by a reduction ratio between the motor 403M of the third driving source 403 and the third arm 14, that is, in the joint 173.

An angular velocity ωA3' corresponding to the rotation around the second rotating axis O2 of the third arm 14 is detected by the second angular velocity sensor 32, and the detected angular velocity ωA3' is output to a correction unit 612. For example, the correction unit 612 multiplies the angular velocity ωA3' input from the second angular velocity sensor 32 by cos α2 cos β2. ωA3' cos α2 cos β2 is output to the adder-subtracter 622 as an angular velocity ωA3 around the second rotating axis O2 of the third arm 14. However, if θ2=0°, since ωA3'=ωA3, correction by the correction unit 612 is not required, and the correction unit 612 may be omitted.

Since the second rotating axis O2 and the third rotating axis O3 are orthogonal to the first rotating axis O1, it is possible to obtain the angular velocity around the second rotating axis O2 of the third arm 14 easily and reliably without being affected by operation or vibration of the first arm 12.

The angular velocity ωA3, the angular velocity ωA2 m, and the angular velocity ωA3 m are input to the adder-subtracter 622, and the adder-subtracter 622 outputs a value ωA2 s (=ωA3 −ωA2 m−ωA3 m) obtained by subtracting the angular velocity ωA2 m and the angular velocity ωA3 m from the angular velocity ωA3 to the conversion unit 582. The value ωA2 s corresponds to the vibrational component (vibrational angular velocity) of the total angular velocity around the second rotating axis O2 of the second arm 13 and the third arm 14. Hereinafter, ωA2 s is referred to as a vibrational angular velocity. In this embodiment, feedback control is performed to return a below-described gain Ka multiple of the vibrational angular velocity ωA2 s (in detail, an angular velocity ωm2 s in the motor 402M which is a value produced on the basis of the vibrational angular velocity ωA2 s) to the input side of the second driving source 402. Specifically, the feedback control is performed on the second driving source 402 such that the vibrational angular velocity ωA2 s becomes close to 0 as much as possible. Accordingly, it is possible to suppress vibration of the robot 1. In the feedback control, the angular velocity of the second driving source 402 is controlled.

The conversion unit 582 converts the vibrational angular velocity ωA2 s to the angular velocity ωm2 s in the second driving source 402, and outputs the angular velocity ωm2 s to the correction value calculation unit 592. The conversion can be performed by multiplying the vibrational angular velocity ωA2 s by a reduction ratio between the motor 402M of the second driving source 402 and the second arm 13, that is, in the joint 172.

The correction value calculation unit 592 multiplies the angular velocity ωm2 s by the gain (feedback gain) Ka as a preset coefficient, obtains a correction value Ka·ωm2s, and outputs the correction value Ka·ωm2 s to the adder 602. The gain Ka in the second driving source control unit 202 and the gain Ka in the first driving source control unit 201 may be the same or different from each other.

The angular velocity ωm2 and the correction value Ka·ωm2 s are input to the adder 602. The adder 602 outputs the sum of the angular velocity ωm2 and the correction value Ka·ωm2 s to the subtracter 532 as the angular velocity feedback value ωfb. A subsequent operation is as described above.

As shown in FIG. 13, in addition to the position command Pc of the third driving source 403, the detection signal from the third position sensor 413 is input to the third driving source control unit 203. The third driving source control unit 203 drives the third driving source 403 by feedback control using the respective detection signals such that the rotation angle (position feedback value Pfb) of the third driving source 403 calculated from the detection signal of the third position sensor 413 becomes the position command Pc and a below-described angular velocity feedback value ωfb becomes a below-described angular velocity command ωc.

That is, the position command Pc and a below-described position feedback value Pfb from the rotation angle calculation unit 553 are input to the subtracter 513 of the third driving source control unit 203. In the rotation angle calculation unit 553, the number of pulses input from the third position sensor 413 is counted, and the rotation angle of the third driving source 403 according to the count value is output to the subtracter 513 as the position feedback value Pfb. The subtracter 513 outputs the deviation (the value obtained by subtracting the position feedback value Pfb from a target value of the rotation angle of the third driving source 403) between the position command Pc and the position feedback value Pfb to the position control unit 523.

The position control unit 523 performs predetermined calculation processing using the deviation input from the subtracter 513, and a proportional gain or the like as a preset coefficient, and calculates a target value of the angular velocity of the third driving source 403 according to the deviation. The position control unit 523 outputs a signal representing the target value (command value) of the angular velocity of the third driving source 403 to the subtracter 533 as the angular velocity command ωc. Here, in this embodiment, although proportional control (P control) is performed as feedback control, the invention is not limited thereto.

In the angular velocity calculation unit 563, the angular velocity of the third driving source 403 is calculated on the basis of the frequency of a pulse signal input from the third position sensor 413, and the angular velocity is output to the subtracter 533 as the angular velocity feedback value ωfb.

The angular velocity command ωc and the angular velocity feedback value ωfb are input to the subtracter 533. The subtracter 533 outputs the deviation (the value obtained by subtracting the angular velocity feedback value ωfb from the target value of the angular velocity of the third driving source 403) between the angular velocity command ωc and the angular velocity feedback value ωfb to the angular velocity control unit 543.

The angular velocity control unit 543 performs predetermined calculation processing including integration using the deviation input from the subtracter 533, and a proportional gain, an integral gain, and the like as preset coefficients, produces a driving signal (driving current) of the third driving source 403 according to the deviation, and supplies the driving signal to the motor 403M through the motor driver 303. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the third driving source 403 is controlled.

The driving source control units 204 to 206 are the same as the third driving source control unit 203, and thus, description thereof will not be repeated.

As described above, in the robot 1 and the robot system 10, the angular velocity of the first arm 12 can be detected by the first angular velocity sensor 31, and since the third rotating axis O3 is parallel to the second rotating axis O2, the angular velocity of the third arm 14 including the rotation amount of the second arm 13 can be detected by the second angular velocity sensor 32. Then, it is possible to suppress vibration on the basis of these detection results.

Since the angular velocity of the third arm 14 including the rotation amount of the second arm 13 is detected by the second angular velocity sensor 32 instead of the angular velocity of the second arm 13, it is possible to suppress vibration more reliably. It is also possible to reduce the number of angular velocity sensors, to reduce cost, and to simplify the configuration compared to a case where an angular velocity sensor is also provided in the second arm 13. The actuation of the second driving source 402 which rotates the second arm 13 on the base end side from the third arm 14 is controlled, whereby it is possible to increase the effect of suppressing vibration of the robot 1.

Second Embodiment

Figure 17:
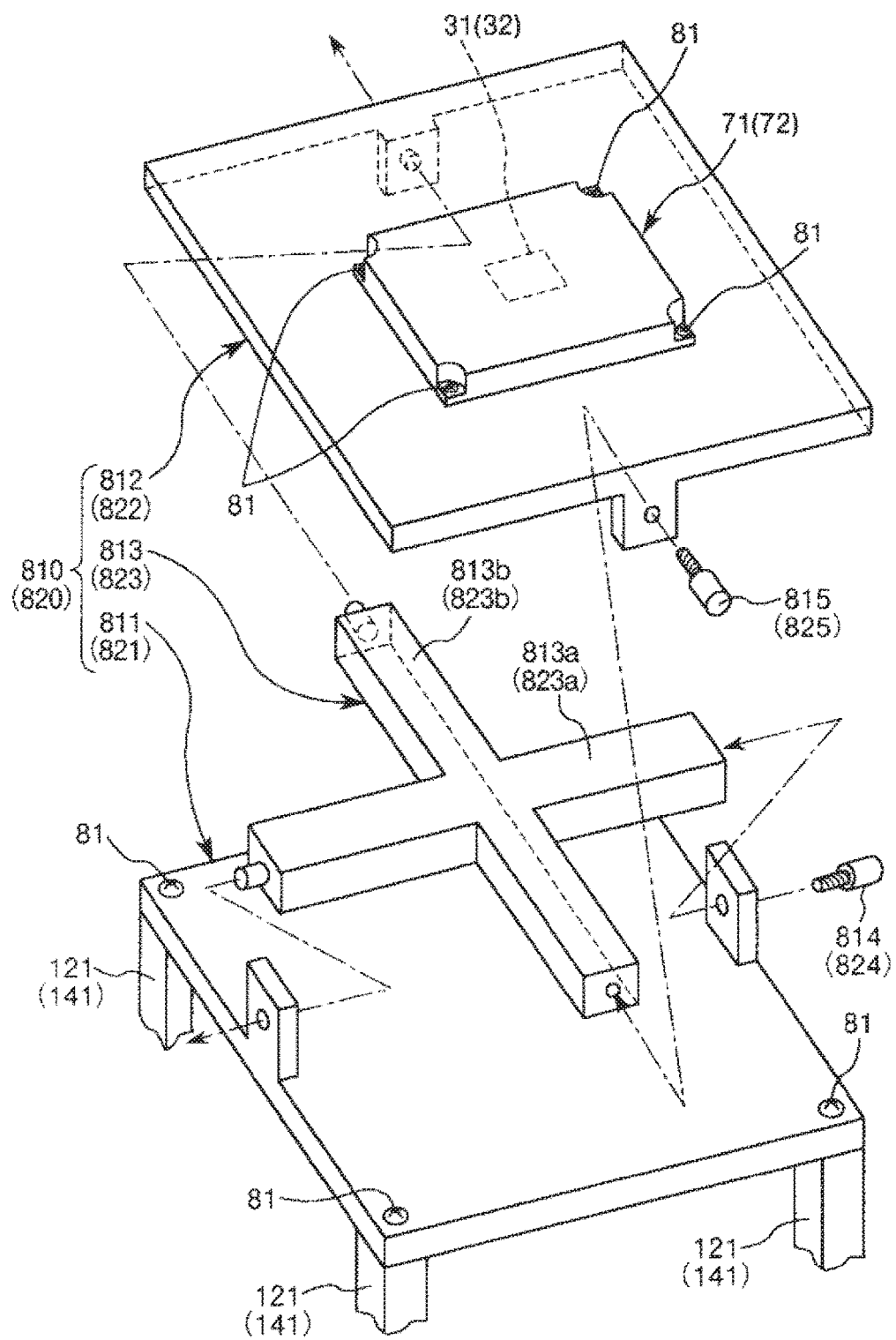
FIG. 17 is a perspective view showing a position adjustment member in a robot according to a second embodiment of the invention.

FIG. 17 is a perspective view showing a position adjustment member in a robot according to a second embodiment of the invention.

Hereinafter, the robot of the second embodiment will be described focusing on a difference from the above-described first embodiment, and description of the same matters will not be repeated.

The robot according to the second embodiment of the invention is the same as that in the above-described first embodiment, except that an angular velocity sensor unit is arranged in an arm through a position adjustment member. The same parts as those in the above-described first embodiment are represented by the same reference numerals.

As shown in FIG. 17, in the robot 1 of this embodiment, the first angular velocity sensor unit 71 is fixed to the first arm 12 through a posture adjustment member (first position adjustment member) 810. The posture adjustment member 810 has a universal joint and is configured to adjust the posture of the first angular velocity sensor unit 71. Specifically, the posture adjustment member 810 has a fixed portion 811 which is fixed to the first arm 12 (arm-side attachment portions 121), a movable portion 812 to which the first angular velocity sensor unit 71 is fixed, and a spider 813 which connects the fixed portion 811 and the movable portion 812. The spider 813 has a cross shape in which rod-shaped portions 813a and 813b are orthogonal to each other, both ends of the rod-shaped portion 813a are connected to the fixed portion 811, and both ends of the rod-shaped portion 813b are connected to the movable portion 812. The posture adjustment member 810 further has a first fixing screw 814 which passes through the fixed portion 811 and is threaded into the rod-shaped portion 813a, and a second fixing screw 815 which passes through the movable portion 812 and is threaded into the rod-shaped portion 813b. If the first fixing screw 814 is unfastened, the spider 813 is rotatable around the axis of the rod-shaped portion 813a with respect to the fixed portion 811, and if the first fixing screw 814 is fastened, the spider 813 is not rotatable with respect to the fixed portion 811, and the posture of the spider 813 with respect to the fixed portion 811 is fixed and maintained. Similarly, if the second fixing screw 815 is unfastened, the movable portion 812 is rotatable around the axis of the rod-shaped portion 813b with respect to the spider 813, and if the second fixing screw 815 is fastened, the movable portion 812 is not rotatable with respect to the spider 813, and the posture of the movable portion 812 with respect to the spider 813 is fixed and maintained. With the posture adjustment member 810, it is possible to freely adjust the inclination angle θ1 (α1, β1) of the detection axis 31a of the first angular velocity sensor 31 with respect to the first rotating axis O1.

In general, as the inclination angle θ1 (α1, β1) increases, the deviation between the angular velocity ωA1 around the first rotating axis O1 of the first arm 12 output from the correction unit 611 and the actual angular velocity around the first rotating axis O1 of the first arm 12 tends to increase. Accordingly, it is preferable to suppress the inclination angle θ1 (α1, β1) to be as small as possible. However, there is a case where, if the inclination angle θ1 (α1, β1) is within a specific range, the deviation between the angular velocity ωA1 around the first rotating axis O1 of the first arm 12 output from the correction unit 611 and the actual angular velocity around the first rotating axis O1 of the first arm 12 decreases, compared to a case where the inclination angle is out of the range, due to various factors depending on the configuration of the robot 1. The posture adjustment member 810 is provided, whereby it is possible to match the detection axis 31a at the inclination angle θ1 (α1, β1) within the above-described range, and to detect the angular velocity around the first rotating axis O1 of the first arm 12 more accurately.

As shown in FIG. 17, the second angular velocity sensor unit 72 is fixed to the third arm 14 (arm-side attachment portion 141) through a posture adjustment member (second position adjustment member) 820. The posture adjustment member 820 has a universal joint and is configured to adjust the posture of the second angular velocity sensor unit 72. Specifically, the posture adjustment member 820 has a fixed portion 821 which is fixed to the third arm 14, a movable portion 822 to which the second angular velocity sensor unit 72 is fixed, and a spider 823 which connects the fixed portion 821 and the movable portion 822. The spider 823 has a cross shape in which rod-shaped portions 823a and 823b are orthogonal to each other, both ends of the rod-shaped portion 823a are connected to the fixed portion 821, and both ends of the rod-shaped portion 823b are connected to the movable portion 822. The posture adjustment member 820 has a first fixing screw 824 which passes through the fixed portion 821 and is threaded into the rod-shaped portion 823a, and a second fixing screw 825 which passes through the movable portion 822 and is threaded into the rod-shaped portion 823b. If the first fixing screw 824 is unfastened, the spider 823 is rotatable around the axis of the rod-shaped portion 823a with respect to the fixed portion 821, and if the first fixing screw 824 is fastened, the spider 823 is not rotatable with respect to the fixed portion 821, and the posture of the spider 823 with respect to the fixed portion 821 is fixed and maintained. Similarly, if the second fixing screw 825 is unfastened, the movable portion 822 is rotatable around the axis of the rod-shaped portion 823b with respect to the spider 823, and if the second fixing screw 825 is fastened, the movable portion 822 is not rotatable with respect to the spider 823, and the posture of the movable portion 822 with respect to the spider 823 is fixed and maintained. With the posture adjustment member 820, it is possible to freely adjust the inclination angle θ2 (α2, β2) of the detection axis 32a of the second angular velocity sensor 32 with respect to the second rotating axis O2.

In general, as the inclination angle θ2 (α2, β2) increases, the deviation between the angular velocity ωA3 around the second rotating axis O2 of the third arm 14 output from the correction unit 612 and the actual angular velocity around the second rotating axis O2 of the third arm 14 tends to increase. Accordingly, it is preferable to suppress the inclination angle θ2 (α2, β2) to be as small as possible. However, there is a case where, if the inclination angle θ2 (α2, β2) is within a specific range, the deviation between the angular velocity ωA3 around the second rotating axis O2 of the third arm 14 output from the correction unit 612 and the actual angular velocity around the second rotating axis O2 of the third arm 14 decreases, compared to a case where the inclination angle is out of the range, due to various factors depending on the configuration of the robot 1. The posture adjustment member 820 is provided, whereby it is possible to match the detection axis 32a at the inclination angle θ2 (α2, β2) within the above-described range, and to detect the angular velocity around the second rotating axis O2 of the third arm 14 more accurately.

It is preferable that the posture adjustment members 810 and 820 are made of a conductive material, such as metal. Accordingly, the ground terminals of the circuit units 713 and 723 can be electrically connected to the arm bodies 2a and 2c of the first and third arms 12 and 14 through the wirings, the screws 81, and the posture adjustment members 810 and 820 and grounded.

The configuration of each of the posture adjustment members 810 and 820 is not particularly limited insofar as the posture of each of the first and second angular velocity sensor units 71 and 72 (the direction of each of the detection axes 31a and 32a) can be adjusted.

According to the second embodiment, the same effects as in the above-described first embodiment can be exhibited.

Third Embodiment

Figure 18:
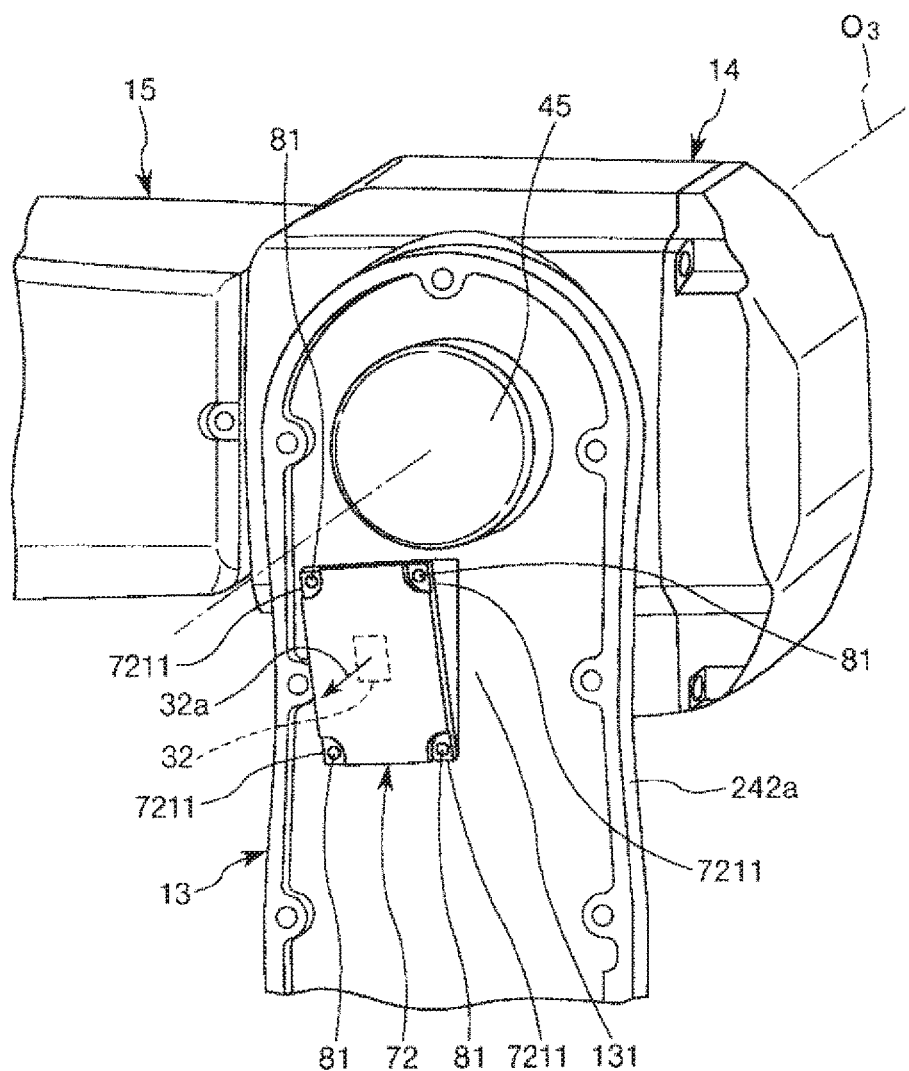
FIG. 18 is a perspective view showing a second arm of a robot according to a third embodiment of the invention.
Figure 19:
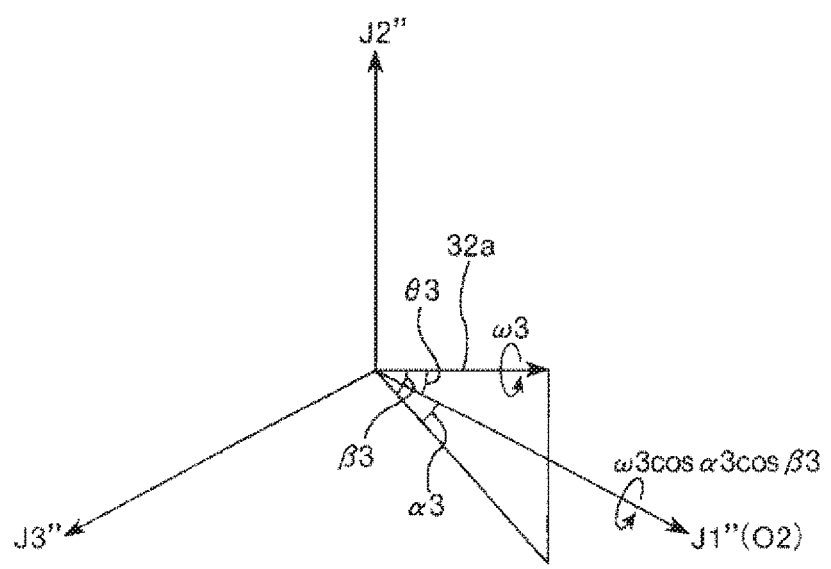
FIG. 19 is a diagram showing the slope between a detection axis of an angular velocity sensor and a rotating axis of an arm.
Figure 20:
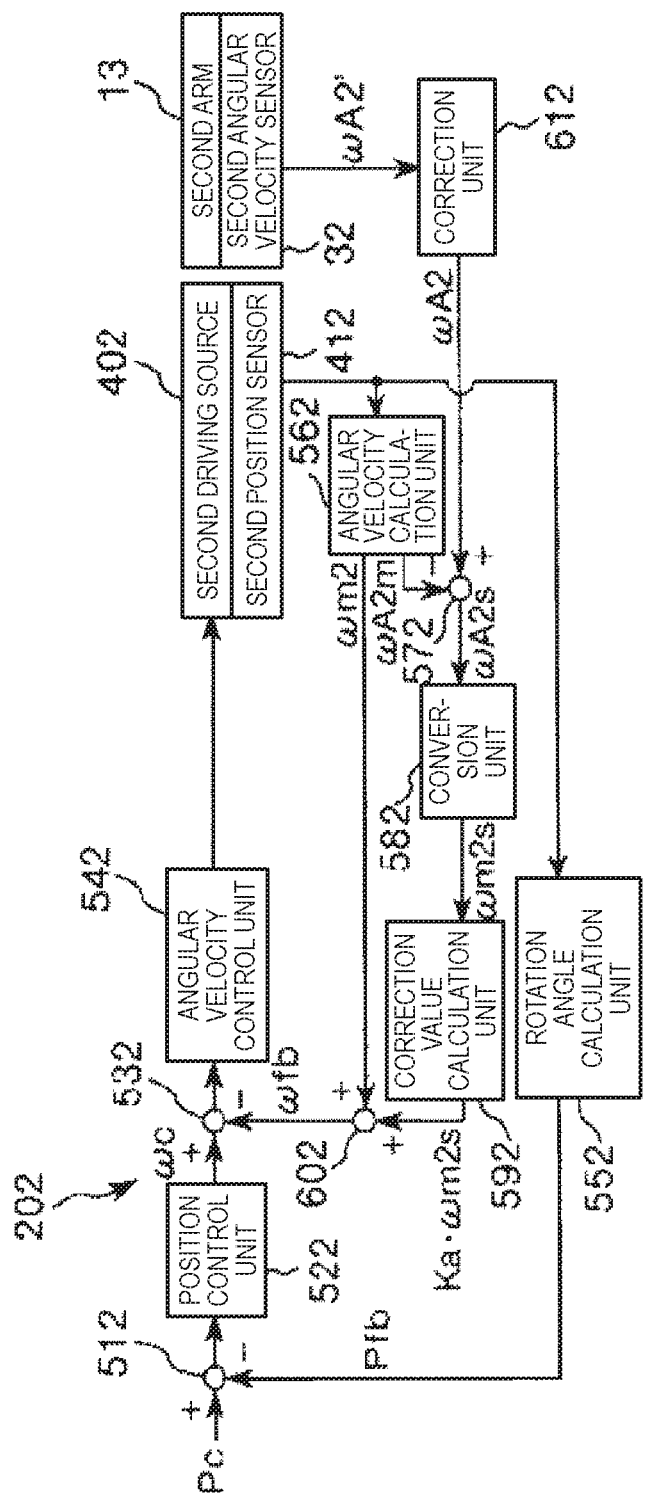
FIG. 20 is a block diagram of a part of the robot shown in FIG. 18.
Figure 21:
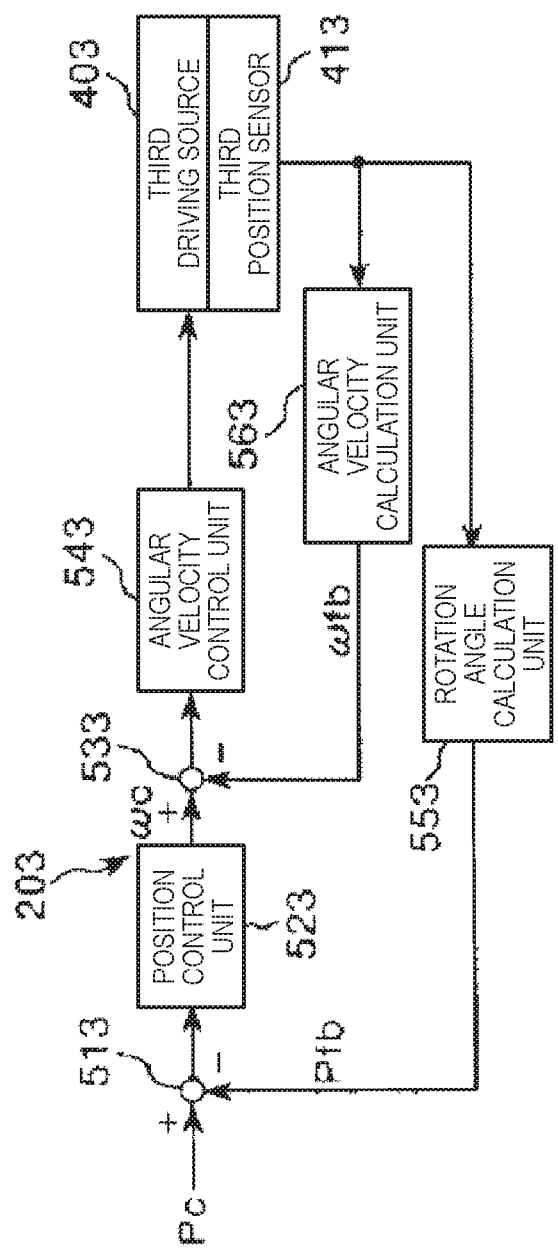
FIG. 21 is a block diagram of a part of the robot shown in FIG. 18.

FIG. 18 is a perspective view showing a second arm of a robot according to a third embodiment of the invention. FIG. 19 is a diagram showing the slope between a detection axis of an angular velocity sensor and a rotating axis of an arm. FIGS. 20 and 21 are block diagrams of a part of the robot shown in FIG. 18, respectively.

Hereinafter, the robot of the third embodiment will be described focusing on a difference from the above-described first embodiment, and description of the same matters will not be repeated.

The robot according to the third embodiment of the invention is the same as that in the above-described first embodiment, except that the second angular velocity sensor unit is arranged in the second arm. The same parts as those in the above-described first embodiment are represented by the same reference numerals.

As shown in FIG. 18, in the robot 1 of this embodiment, the second angular velocity sensor 32 (second angular velocity sensor unit 72) is provided in the second arm 13. The installation position of the second angular velocity sensor 32 in the second arm 13 is not particularly limited, and in this embodiment, as shown in FIG. 18, the second angular velocity sensor 32 is provided in an end portion of the arm body 2b of the second arm 13 on an opposite side to the internal cable 85. In other words, the second angular velocity sensor 32 is arranged in the tongue piece portion 242a separated from the tongue piece portion 242b, through which the cable 85 passes. Accordingly, it is possible to prevent the second angular velocity sensor 32 from being affected by noise from the cable 85, and to prevent the circuit unit 723, the wiring, and the second angular velocity sensor 32 of the second angular velocity sensor unit 72 from being short-circuited by the cable 85.

It is preferable that the second angular velocity sensor 32 is located on the front end side of the second arm 13. In other words, it is preferable that the second angular velocity sensor 32 (second angular velocity sensor unit 72) is arranged such that the distance from the third rotating axis O3 is shorter than the distance from the second rotating axis O2. With this, the second angular velocity sensor 32 can be arranged at a position close to the third arm 14. For this reason, as described below, the vibrational component of the third arm 14 transmitted to the second arm 13 can be detected by the second angular velocity sensor 32 more efficiently (before attenuation increases). Accordingly, it is possible to increase the effect of suppressing vibration of the robot 1.

The speed reducer 45 is provided on the third rotating axis O3 in the third arm 14, and the third arm 14 is connected to the second arm 13 through the speed reducer 45. If a rigid "planetary gear-type" speed reducer is used as the speed reducer 45, the vibrational component (the vibrational component of the angular velocity around the third rotating axis O3, and the same applies to the below) of the third arm 14 is easily transmitted to the second arm 13 through the speed reducer 45. For this reason, the angular velocity of the second arm 13 including the vibrational component of the third arm 14 can be detected by the second angular velocity sensor 32 in the second arm 13, and it is possible to increase the effect of suppressing vibration of the robot 1.

The second arm 13 has an arm-side attachment portion 131 which is formed integrally with the arm body 2b and to which the second angular velocity sensor unit 72 (second housing 721) is attached. In each corner portion of the arm-side attachment portion 131, a threaded bore into which the screw 81 is threaded is formed.

When attaching the second angular velocity sensor unit 72 to the second arm 13, the four screws 81 are respectively inserted into the holes 7212 of the second housing 721 and threaded into the threaded bores in the front end portion of the arm-side attachment portion 131 of the second arm 13.

With this, the four attachment portions 7211 of the second housing 721 are fixed to the arm-side attachment portion 131 of the second arm 13 by the screws 81. That is, the second angular velocity sensor unit 72 is attached to the arm-side attachment portion 131 of the second arm 13. In this case, there is nothing between the arm-side attachment portion 131 and the second angular velocity sensor unit 72, that is, the second angular velocity sensor unit 72 is directly attached to the arm-side attachment portion 131. Accordingly, it is possible to attach the second angular velocity sensor unit 72 to the second arm 13 reliably, and to allow the second angular velocity sensor unit 72 to rotate integrally with the second arm 13 reliably.

If the screws 81 are inserted into the holes 7212 of the second housing 721 and threaded into the threaded bores of the arm-side attachment portion 131, the screws 81 are electrically connected to the wiring of the circuit board 722 electrically connected to the ground terminal of the circuit unit 723, and the front end portions of the screws 81 are electrically connected to the arm-side attachment portion 131. With this, the ground terminal of the circuit unit 723 is electrically connected to the arm body 2b of the second arm through the wiring and the screws 81 and grounded. Accordingly, it is possible to reduce the number of components for grounding and to simplify the configuration.

The second angular velocity sensor unit 72 is provided such that the detection axis 32a of the second angular velocity sensor 32 inclined with respect to the second rotating axis O2 at a predetermined angle (third angle) θ3. It should suffice that the angle θ3 is equal to or greater than 0° and smaller than 90° (0°≤θ3<90°). If θ3=0°, the detection axis 32a of the second angular velocity sensor 32 matches the second rotating axis O2. For this reason, the angular velocity detected by the second angular velocity sensor 32 substantially matches the angular velocity around the second rotating axis O2 of the second arm 13. Accordingly, it is possible to detect the angular velocity around the second rotating axis O2 of the second arm 13 without substantially correcting the angular velocity detected by the second angular velocity sensor 32.

If 0°<θ3<90°, the detection axis 32a of the second angular velocity sensor 32 is inclined with respect to the second rotating axis O2. For this reason, the angular velocity detected by the second angular velocity sensor 32 is deviated from the angular velocity around the second rotating axis O2 of the second arm 13. However, if the angle θ3 is set to a predetermined angle in advance, it is possible to detect the angular velocity around the second rotating axis O2 of the second arm 13 accurately by correcting the angular velocity detected by the second angular velocity sensor 32 on the basis of the angle θ3. The correction at this time is a simple computation, and complicated and enormous computation is not required. For this reason, a computation error is less likely to occur, and it is possible to reliably suppress vibration and to increase a response speed in the control of the robot 1.

For example, as shown in FIG. 19, a first axis J1" parallel to the second rotating axis O2, a second axis J2" orthogonal to the first axis J1", and a third axis J3" orthogonal to both the first axis J1" and the second axis J2" are set, and when the angle around the second axis J2" of the detection axis 32a is α3, the angle around the third axis J3" of the detection axis 32a is β3, and the angular velocity which is detected by the second angular velocity sensor 32 is ω3, ω3 cos α3 cos β3 is set as the angular velocity around the second rotating axis O2 of the second arm 13. In order to secure high correction precision, it is preferable that θ3 is as small as possible, and specifically, satisfies the range of 0°<θ3≤15°. When this range is satisfied, it is possible to detect the angular velocity around the second rotating axis O2 of the second arm 13 with higher precision. However, the correction method is not limited to the above-described method.

In recent years, with the advancement of reduction in size and weight of the robot 1, there is a case where the second angular velocity sensor 32 cannot be arranged at θ3=0° depending on the internal space of the second arm 13. In this case, the second angular velocity sensor 32 is arranged in the second arm 13 such that θ3 becomes a desired angle, whereby it is possible to detect the angular velocity around the second rotating axis O2 of the second arm 13 with high precision.

Next, the configuration of the robot control device 20 will be described referring to FIGS. 20 and 21. However, the driving source control units 201, 204, 205, and 206 are the same as those in the above-described first embodiment, and thus, description thereof will not be repeated.

As shown in FIG. 20, the second driving source control unit 202 has a subtracter 512, a position control unit 522, a subtracter 532, an angular velocity control unit 542, a rotation angle calculation unit 552, an angular velocity calculation unit 562, a subtracter 572, a conversion unit 582, a correction value calculation unit 592, and an adder 602.

In addition to the position command Pc of the second driving source 402, the detection signals from the second position sensor 412 and the second angular velocity sensor 32 (correction unit 612) are input to the second driving source control unit 202. The second driving source control unit 202 drives the second driving source 402 by feedback control using the respective detection signals such that the rotation angle (position feedback value Pfb) of the second driving source calculated from the detection signal of the second position sensor 412 becomes the position command Pc and a below-described angular velocity feedback value ωfb becomes a below-described angular velocity command ωc.

That is, the position command Pc and a below-described position feedback value Pfb from the rotation angle calculation unit 552 are input to the subtracter 512 of the second driving source control unit 202. In the rotation angle calculation unit 552, the number of pulses input from the second position sensor 412 is counted, and the rotation angle of the second driving source 402 according to the count value is output to the subtracter 512 as the position feedback value Pfb. The subtracter 512 outputs the deviation (the value obtained by subtracting the position feedback value Pfb from a target value of the rotation angle of the second driving source 402) between the position command Pc and the position feedback value Pfb to the position control unit 522.

The position control unit 522 performs predetermined calculation processing using the deviation input from the subtracter 512, and a proportional gain or the like as a preset coefficient, and calculates the target value of the angular velocity of the second driving source 402 according to the deviation. The position control unit 522 outputs a signal representing the target value (command value) of the angular velocity of the second driving source 402 to the subtracter 532 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 532. The subtracter 532 outputs the deviation (the value obtained by subtracting the angular velocity feedback value ωfb from the target value of the angular velocity of the second driving source 402) between the angular velocity command ωc and the angular velocity feedback value ωfb to the angular velocity control unit 542.

The angular velocity control unit 542 performs predetermined calculation processing including integration using the deviation input from the subtracter 532, and a proportional gain, an integral gain, and the like as preset coefficients, produces a driving signal (driving current) of the second driving source 402 according to the deviation, and supplies the driving signal to the motor 402M through the motor driver 302. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the second driving source 402 is controlled.

Next, the angular velocity feedback value ωfb in the second driving source control unit 202 will be described.

In the angular velocity calculation unit 562, an angular velocity ωm2 of the second driving source 402 is calculated on the basis of the frequency of a pulse signal input from the second position sensor 412, and the angular velocity ωm2 is output to the adder 602.

In the angular velocity calculation unit 562, an angular velocity ωA2 m around the second rotating axis O2 of the second arm 13 is calculated on the basis of the frequency of the pulse signal input from the second position sensor 412, and the angular velocity ωA2 m is output to the subtracter 572. The angular velocity ωA2 m is a value obtained by dividing the angular velocity ωm2 by a reduction ratio between the motor 402M of the second driving source 402 and the second arm 13, that is, in the joint 172.

An angular velocity ωA2' corresponding to the rotation around the second rotating axis O2 of the second arm 13 is detected by the second angular velocity sensor 32, and the detected angular velocity ωA2' is output to the correction unit 612. For example, the correction unit 612 multiplies the angular velocity ωA2' input from the second angular velocity sensor 32 by cos α2 cos β2. ωA2' cos α2 cos β2 is output to the adder-subtracter 572 as an angular velocity ωA2 around the second rotating axis O2 of the second arm 13. However, if θ2=0°, since ωA2'=ωA2, correction by the correction unit 612 is not required, and the correction unit 612 may be omitted.

Since the second rotating axis O2 is orthogonal to the first rotating axis O1, it is possible to obtain the angular velocity around the second rotating axis O2 of the second arm 13 easily and reliably without being affected by operation or vibration of the first arm 12.

The angular velocity ωA2 and the angular velocity ωA2 m are input to the subtracter 572, and the subtracter 572 outputs a value ωA2 s (=ωA2 −ωA2m) obtained by subtracting the angular velocity ωA2 m from the angular velocity ωA2 to the conversion unit 582. As described above, since the second angular velocity sensor 32 also detects the vibrational component of the angular velocity of the third arm 14, the value ωA2 s corresponds to the total of the vibrational component (vibrational angular velocity) of the angular velocity around the second rotating axis O2 of the second arm 13 and the vibrational component (vibrational angular velocity) of the angular velocity around the third rotating axis O3 of the third arm 14. Hereinafter, ωA2 s is referred to as a vibrational angular velocity. In this embodiment, feedback control is performed to return a below-described gain Ka multiple of the vibrational angular velocity ωA2 s (in detail, an angular velocity ωm2 s in the motor 402M which is a value produced on the basis of the vibrational angular velocity ωA2 s) to the input side of the second driving source 402. Specifically, the feedback control is performed on the second driving source 402 such that the vibrational angular velocity ωA2 s becomes close to 0 as much as possible. Accordingly, it is possible to suppress vibration of the robot 1. In the feedback control, the angular velocity of the second driving source 402 is controlled.

The conversion unit 582 converts the vibrational angular velocity ωA2 s to the angular velocity ωm2 s in the second driving source 402, and outputs the angular velocity ωm2 s to the correction value calculation unit 592. The conversion can be performed by multiplying the vibrational angular velocity ωA2 s by a reduction ratio between the motor 402M of the second driving source 402 and the second arm 13, that is, in the joint 172.

The correction value calculation unit 592 multiplies the angular velocity ωm2 s by the gain (feedback gain) Ka as a preset coefficient, obtains a correction value Ka·ωm2 s, and outputs the correction value Ka·ωm2 s to the adder 602.

The angular velocity ωm2 and the correction value Ka·ωm2 s are input to the adder 602. The adder 602 outputs the sum of the angular velocity ωm2 and the correction value Ka·ωm2 s to the subtracter 532 as the angular velocity feedback value ωfb. A subsequent operation is as described above.

As shown in FIG. 21, the third driving source control unit 203 has a subtracter 513, a position control unit 523, a subtracter 533, an angular velocity control unit 543, a rotation angle calculation unit 553, and an angular velocity calculation unit 563.

In addition to the position command Pc of the third driving source 403, the detection signal from the third position sensor 413 is input to the third driving source control unit 203. The third driving source control unit 203 drives the third driving source 403 by feedback control using the respective detection signals such that the rotation angle (position feedback value Pfb) of the third driving source 403 calculated from the detection signal of the third position sensor 413 becomes the position command Pc and a below-described angular velocity feedback value ωfb becomes a below-described angular velocity command ωc.

That is, the position command Pc and a below-described position feedback value Pfb from the rotation angle calculation unit 553 are input to the subtracter 513 of the third driving source control unit 203. In the rotation angle calculation unit 553, the number of pulses input from the third position sensor 413 is counted, and the rotation angle of the third driving source 403 according to the count value is output to the subtracter 513 as the position feedback value Pfb. The subtracter 513 outputs the deviation (the value obtained by subtracting the position feedback value Pfb from a target value of the rotation angle of the third driving source 403) between the position command Pc and the position feedback value Pfb to the position control unit 523.

The position control unit 523 performs predetermined calculation processing using the deviation input from the subtracter 513, and a proportional gain or the like as a preset coefficient, and calculates a target value of the angular velocity of the third driving source 403 according to the deviation. The position control unit 523 outputs a signal representing the target value (command value) of the angular velocity of the third driving source 403 to the subtracter 533 as the angular velocity command ωc. Here, in this embodiment, although proportional control (P control) is performed as feedback control, the invention is not limited thereto.

In the angular velocity calculation unit 563, the angular velocity of the third driving source 403 is calculated on the basis of the frequency of a pulse signal input from the third position sensor 413, and the angular velocity is output to the subtracter 533 as the angular velocity feedback value ωfb.

The angular velocity command ωc and the angular velocity feedback value ωfb are input to the subtracter 533. The subtracter 533 outputs the deviation (the value obtained by subtracting the angular velocity feedback value ωfb from the target value of the angular velocity of the third driving source 403) between the angular velocity command ωc and the angular velocity feedback value ωfb to the angular velocity control unit 543.

The angular velocity control unit 543 performs predetermined calculation processing including integration using the deviation input from the subtracter 533, and a proportional gain, an integral gain, and the like as preset coefficients, produces a driving signal (driving current) of the third driving source 403 according to the deviation, and supplies the driving signal to the motor 403M through the motor driver 303. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the third driving source 403 is controlled.

According to the third embodiment, the same effects as the above-described first embodiment can also be exhibited.

Although the robot, the robot control device, and the robot system of the invention have been described on the basis of the illustrated embodiments, the invention is not limited to the embodiments, and the configuration of each unit can be substituted with an arbitrary configuration having the same function. Other arbitrary constituent components may be added to the invention.

As the motor of each driving source, in addition to the servomotor, for example, a stepping motor or the like may be used. If a stepping motor is used as the motor, as a position sensor, for example, a position sensor which measures the number of driving pulses input to the stepping motor so as to detect the rotation angle of the motor may be used.

The type of each position sensor or each angular velocity sensor is not particularly limited, and for example, an optical type, a magnetic type, an electromagnetic type, an electrical type, or the like may be used.

In the foregoing embodiments, although the actuation of the second driving source rotating the second arm is controlled on the basis of the detection result of the second angular velocity sensor, the invention is not limited thereto, and for example, the actuation of the third driving source rotating the third arm may be controlled on the basis of the detection result of the second angular velocity sensor.

In the foregoing embodiments, although the number of rotating axes of the robot is six, the invention is not limited thereto, and the number of rotating axes of the robot may be three, four, five, or seven or more.

That is, in the foregoing embodiments, although, since the wrist has two arms, the number of arms of the robot is six, the invention is not limited thereto, and the number of arms of the robot may be three, four, five, or seven or more.

In the foregoing embodiments, although the robot is a single-arm robot which has an arm connector with a plurality of arms rotatably connected together, the invention is not limited thereto, and for example, the robot may be a robot having a plurality of arm connectors, for example, a double-arm robot which has two arm connectors with a plurality of arms rotatably connected together, or the like.

What is claimed is:

1. A robot comprising:
   a base;
   an arm that includes a first arm that rotates around a first rotation axis and a second arm that rotates around a second rotation axis extending in a direction different from the first rotation axis;
   a position sensor that is disposed in the base and detects a position of a shaft of a first motor which rotates the first arm; and
   a gyro sensor that is installed at the first arm and detects the inertia of the first arm around the first rotating axis; wherein
   the first arm is coupled to the base and is controlled based on an output from the gyro sensor, and
   a vibration of the arm is suppressed based on the output from the position sensor and the output from the gyro sensor.

2. The robot according to claim 1, wherein
   a vibration of the first arm is suppressed by controlling the first arm based on the output from the position sensor and the output from the gyro sensor.

3. The robot according to claim 1, wherein
   the first rotation axis coincides with a normal of an installation surface of the base.

4. The robot according to claim 2, wherein
   the first rotation axis coincides with a normal of an installation surface of the base.

5. The robot according to claim 1, wherein
   the second rotation axis is perpendicular to the first rotation axis.

6. The robot according to claim 2, wherein
   the second rotation axis is perpendicular to the first rotation axis.

7. The robot according to claim 3, wherein
   the second rotation axis is perpendicular to the first rotation axis.

8. The robot according to claim 4, wherein
   the second rotation axis is perpendicular to the first rotation axis.

9. The robot according to claim 1, wherein
   the first arm is controlled based on a difference between the output from the position sensor and the output from the gyro sensor.

10. The robot according to claim 2, wherein
    the first arm is controlled based on a difference between the output from the position sensor and the output from the gyro sensor.

11. The robot according to claim 3, wherein
    the first arm is controlled based on a difference between the output from the position sensor and the output from the gyro sensor.

12. The robot according to claim 4, wherein
    the first arm is controlled based on a difference between the output from the position sensor and the output from the gyro sensor.

13. The robot according to claim 1, wherein
    the position sensor is disposed in the base; and the gyro sensor detects the inertia of the first arm around the first rotating axis.

14. The robot according to claim 2, wherein
the position sensor is disposed in the base; and
the gyro sensor detects the inertia of the first arm around the first rotating axis.

15. The robot according to claim 3, wherein
the position sensor is disposed in the base; and
the gyro sensor detects the inertia of the first arm around the first rotating axis.

16. The robot according to claim 4, wherein
the position sensor is disposed in the base; and
the gyro sensor detects the inertia of the first arm around the first rotating axis.

17. The robot according to claim 9, wherein
the position sensor is disposed in the base; and
the gyro sensor detects the inertia of the first arm around the first rotating axis.

18. The robot according to claim 10, wherein
the position sensor is disposed in the base; and
the gyro sensor detects the inertia of the first arm around the first rotating axis.

19. The robot according to claim 11, wherein
the position sensor is disposed in the base; and
the gyro sensor detects the inertia of the first arm around the first rotating axis.

20. The robot according to claim 12, wherein
the position sensor is disposed in the base; and
the gyro sensor detects the inertia of the first arm around the first rotating axis.

* * * * *